US008175236B2

(12) United States Patent
Pandey et al.

(10) Patent No.: US 8,175,236 B2
(45) Date of Patent: May 8, 2012

(54) IMS AND SMS INTERWORKING

(75) Inventors: Vinod Kumar Pandey, Redmond, WA (US); Karl J. Schlieber, Roswell, GA (US); Matthew Wayne Stafford, Austin, TX (US); Jianrong Wang, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1138 days.

(21) Appl. No.: 12/014,415

(22) Filed: Jan. 15, 2008

(65) Prior Publication Data

US 2009/0129372 A1    May 21, 2009

Related U.S. Application Data

(60) Provisional application No. 60/988,761, filed on Nov. 16, 2007.

(51) Int. Cl.
*H04M 15/10* (2006.01)
*H04L 12/56* (2006.01)
*G06F 15/16* (2006.01)

(52) U.S. Cl. ........... 379/114.2; 370/329; 370/331; 370/338; 370/352; 370/466; 455/413; 455/436; 455/445; 455/458; 455/466; 704/236; 705/14.64; 705/26.1; 709/206; 709/230

(58) Field of Classification Search .......... 370/328, 370/331, 338, 352, 412, 466, 401, 329; 379/114.2; 455/413, 436, 445, 466, 458; 705/14.64, 705/26.1, 35; 709/206, 230; 704/236
See application file for complete search history.

(56) References Cited

U.S. PATENT DOCUMENTS

| 6,910,074 | B1 | 6/2005 | Amin et al. | |
|---|---|---|---|---|
| 6,950,876 | B2 | 9/2005 | Bright et al. | |
| 6,992,995 | B2 * | 1/2006 | Agrawal et al. | 370/328 |
| 7,092,381 | B2 * | 8/2006 | Carlsson et al. | 370/352 |
| 7,092,707 | B2 | 8/2006 | Lau et al. | |
| 7,228,143 | B1 * | 6/2007 | Hamalainen et al. | 455/458 |
| 7,392,184 | B2 * | 6/2008 | Viikki et al. | 704/236 |
| 7,502,345 | B2 * | 3/2009 | Aaltonen | 370/331 |
| 7,590,066 | B2 | 9/2009 | Laumen et al. | |
| 7,623,498 | B2 * | 11/2009 | Lundstrom | 370/338 |
| 7,643,450 | B2 * | 1/2010 | Marinescu et al. | 370/329 |
| 7,689,234 | B2 * | 3/2010 | Horvath et al. | 455/466 |
| 7,701,969 | B2 * | 4/2010 | Carrigan et al. | 370/466 |
| 7,702,342 | B2 | 4/2010 | Duan | |
| 7,715,856 | B2 * | 5/2010 | Shaheen | 455/466 |
| 7,720,029 | B2 * | 5/2010 | Orava et al. | 370/329 |

(Continued)

OTHER PUBLICATIONS

OA dated Sep. 27, 2011 for PCT U.S. Appl. No. 12/346,271, 22 pages.

(Continued)

*Primary Examiner* — Gerald Gauthier

(57) ABSTRACT

Providing for inter-working between SMS network architectures and IMS network architectures in a mobile environment is described herein. By way of example, a next generation (NG) short message service center (SMSC) is provided that can receive SMS messages in mobile application protocol (MAP) and convert such messages to IMS protocol. In addition, the NG SMSC can also receive IMS data and convert the IMS data to an SMS MAP message. The NG SMSC can reference an IMS or an SMS location registry to determine a location of the target device, and convert from IMS to SMS MAP, and vice versa, as suitable. Accordingly, the NG SMSC can provide an efficient interface between legacy SMS and NG IMS network components while preserving legacy protocols associated with such networks.

20 Claims, 15 Drawing Sheets

U.S. PATENT DOCUMENTS

| | | | |
|---|---|---|---|
| 7,835,742 B2 * | 11/2010 | Jaakkola et al. | 455/436 |
| 7,835,758 B2 | 11/2010 | Tu et al. | |
| 7,848,336 B2 * | 12/2010 | Hamel et al. | 370/401 |
| 7,889,716 B2 | 2/2011 | Tejani et al. | |
| 7,957,403 B2 | 6/2011 | Jansson | |
| 2004/0078349 A1 | 4/2004 | Syrjala et al. | |
| 2004/0103157 A1 | 5/2004 | Requena et al. | |
| 2006/0128387 A1 * | 6/2006 | Kim | 455/445 |
| 2006/0149811 A1 | 7/2006 | Bennett et al. | |
| 2006/0168003 A1 * | 7/2006 | Vau et al. | 709/206 |
| 2007/0076857 A1 | 4/2007 | Chava et al. | |
| 2007/0156909 A1 | 7/2007 | Osborn et al. | |
| 2007/0206568 A1 | 9/2007 | Silver et al. | |
| 2007/0206613 A1 | 9/2007 | Silver et al. | |
| 2007/0232337 A1 * | 10/2007 | Yu | 455/466 |
| 2007/0265855 A1 * | 11/2007 | Maandag et al. | 705/1 |
| 2008/0123673 A1 * | 5/2008 | Lee | 370/412 |
| 2008/0186929 A1 * | 8/2008 | Rice et al. | 370/338 |
| 2008/0240117 A1 | 10/2008 | Gavita et al. | |
| 2008/0305813 A1 * | 12/2008 | Rao | 455/466 |
| 2009/0029723 A1 | 1/2009 | Doyle et al. | |
| 2009/0037539 A1 | 2/2009 | Postmus | |
| 2009/0049202 A1 | 2/2009 | Pattison et al. | |
| 2009/0086725 A1 | 4/2009 | Lai et al. | |
| 2009/0106107 A1 * | 4/2009 | Guenster et al. | 705/14 |
| 2009/0111432 A1 * | 4/2009 | Wilson et al. | 455/413 |
| 2009/0129372 A1 * | 5/2009 | Pandey et al. | 370/352 |
| 2009/0186637 A1 * | 7/2009 | Sonntag | 455/466 |
| 2009/0193433 A1 | 7/2009 | Maes | |
| 2009/0222893 A1 | 9/2009 | Jeong et al. | |
| 2009/0291697 A1 | 11/2009 | Kit Tam et al. | |
| 2009/0319412 A1 * | 12/2009 | Karlsson | 705/35 |
| 2010/0146066 A1 | 6/2010 | Bian et al. | |
| 2010/0167762 A1 | 7/2010 | Pandey et al. | |
| 2010/0169424 A1 | 7/2010 | Gustafsson et al. | |
| 2010/0172323 A1 * | 7/2010 | Rexhepi et al. | 370/331 |
| 2010/0215015 A1 | 8/2010 | Miao et al. | |
| 2010/0274916 A1 * | 10/2010 | Lin | 709/230 |
| 2010/0285777 A1 | 11/2010 | Golobrodsky et al. | |
| 2011/0217981 A1 * | 9/2011 | Bachmann et al. | 455/436 |

OTHER PUBLICATIONS

Kurki, Jouko, Messaging in GPRS/3G Networks: Introduction to Multimedia messaging Services (MMS). Wireless Application Protocol (WAP), and IP Multimedia Subsystem (IMS), Apr. 4, 2005, pp. 1-54.

* cited by examiner

US 8,175,236 B2

IMS AND SMS INTERWORKING

CROSS REFERENCE TO RELATED APPLICATIONS

This application claims priority to U.S. Provisional Patent Application Ser. No. 60/988,761, filed on Nov. 16, 2007, entitled "IMS AND SMS INTERWORKING", the entirety of which is incorporated herein by reference.

BACKGROUND

The mobile telephone industry has been associated with tremendous growth over the last several years. Today's mobile devices (e.g., mobile phones, personal digital assistants (PDAs), etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices has largely been effectuated by the recent fixed-mobile convergence.

The rapid growth of the telecommunications industry has fueled a strong competition for market share in mobile-IP communication devices and communication service plans. Because of such competition, mobile network providers have created packet based data networks that can provide IP access to the Internet and other IP-based network resources and applications (e.g., e-mail, web browsing, and so on). Accordingly, a mobile handset or the like can provide access to a rich assortment of shared computing applications and data resources available via such networks. Further, the low cost, worldwide, personal voice communication traditionally available via mobile communication devices is also available on such mobile handset. In addition, mobile communication networks can generally interconnect with local landline services, providing the mobile handset with as much interconnectivity as traditional wire-based telephony and computing devices but with far greater user mobility and flexibility.

As the mobile communication market increases, the numbers of mobile subscribers increase, and the voice and data demands of such subscribers evolve and become more complex, the support networks provided by legacy voice and next generation data services must evolve as well. Higher speed data must be implemented as web-shared applications become more popular. Such higher speed data requires additional processing power, additional air bandwidth (e.g., between base stations and mobile devices), and additional bandwidth in network interfaces to popular data networks such as the Internet. Further, in certain mobile communication architectures such as code division multiple access (CDMA) and subsequent iterations of CDMA technology, providers look to share transmission resources among low demand but high quality voice traffic, and high demand data traffic, in order to share and maximize current bandwidth resources. Accordingly, network architectures must adapt as numbers of subscribers and demands of such subscribers increase and evolve.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Providing for integrated operability between short message service (SMS) network architectures and Internet Protocol (IP) multimedia subsystem (IMS) network architectures in a mobile environment is described herein. According to some aspects, a next generation (NG) short message service center (SMSC) is provided that can receive SMS messages in mobile application protocol (MAP) and convert such messages to IMS protocol. In addition, the NG SMSC can also receive IMS data, for instance an SIP MESSAGE with an SMS message encapsulated therein or IMS data in a native session initiation protocol (SIP), and convert the IMS data to an SMS MAP message. The NG SMSC can interface with legacy SMS network components and with NG IMS network components to determine routing, location and/or charging information associated with a sender and/or receiver of such messages. A MAP SMS message can then be forwarded to an IMS subscriber by way of a packet-switched IMS network, or an IMS message can be routed to a legacy SMS subscriber by way of a legacy SMS circuit-switched network, as suitable. Accordingly, the NG SMSC can provide an efficient interface between legacy SMS and NG IMS network components and mobile devices.

According to further aspects of the subject disclosure, disclosed is an NG SMSC that can interact with native SMS network components and IMS network components in a manner substantially similar to components native to such networks. The NG SMSC can be coupled to an SMS core network and to a serving call session control function (S-CSCF) in an IMS core network. The NG SMSC can receive a MAP SMS message from the SMS core network that is directed to an IMS subscriber, convert the MAP SMS message to an SIP MESSAGE, and forward the SIP MESSAGE to the S-CSCF for further processing. Additionally, the NG SMSC can receive an SIP MESSAGE from the S-CSCF that is directed to an SMS subscriber, convert the SIP MESSAGE to MAP SMS, and forward the MAP SMS message to the SMSC for further processing. Accordingly, the NG SMSC can interact with the SMS core network in a similar manner as an MSC, and can interact with the S-CSCF of the IMS core network in a similar manner as an SIP application server. Thus, the NG SMSC provides an efficient interface between legacy SMS networks and NG IMS networks without requiring any change in communication protocols native to such networks.

According to one or more additional aspects, disclosed is a NG SMSC that can interface with legacy SMS routing functions to perform efficient charging and pre-paid billing system checks associated with mobile network charging functions. For instance, the NG SMSC can perform a pre-paid function check associated with an initiating and a terminating subscriber/device. If the sender or recipient of an SMS message is a legacy SMS subscriber, the NG SMSC can generate a charging data record (CDR) associated with such SMS message and forward a result to a network billing system. If the SMS message was delivered by the SMS network, then the NG SMSC can also receive a delivery result in order to update charging as suitable. In addition to the foregoing, the NG SMSC can receive a result of a pre-paid function check performed by a component of the SMS network. If the SMS message was routed to a recipient (e.g., an IMS subscriber) by the NG SMSC, the NG SMSC can further return a delivery result (e.g., success or failure) to the SMS network so that charging can be updated by the SMS network. Accordingly, the NG SMSC can assist in performing charging functions without increasing a number of queries to the charging systems or to the short message peer-to-peer protocol (SMPP) protocol utilized by the SMS network.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
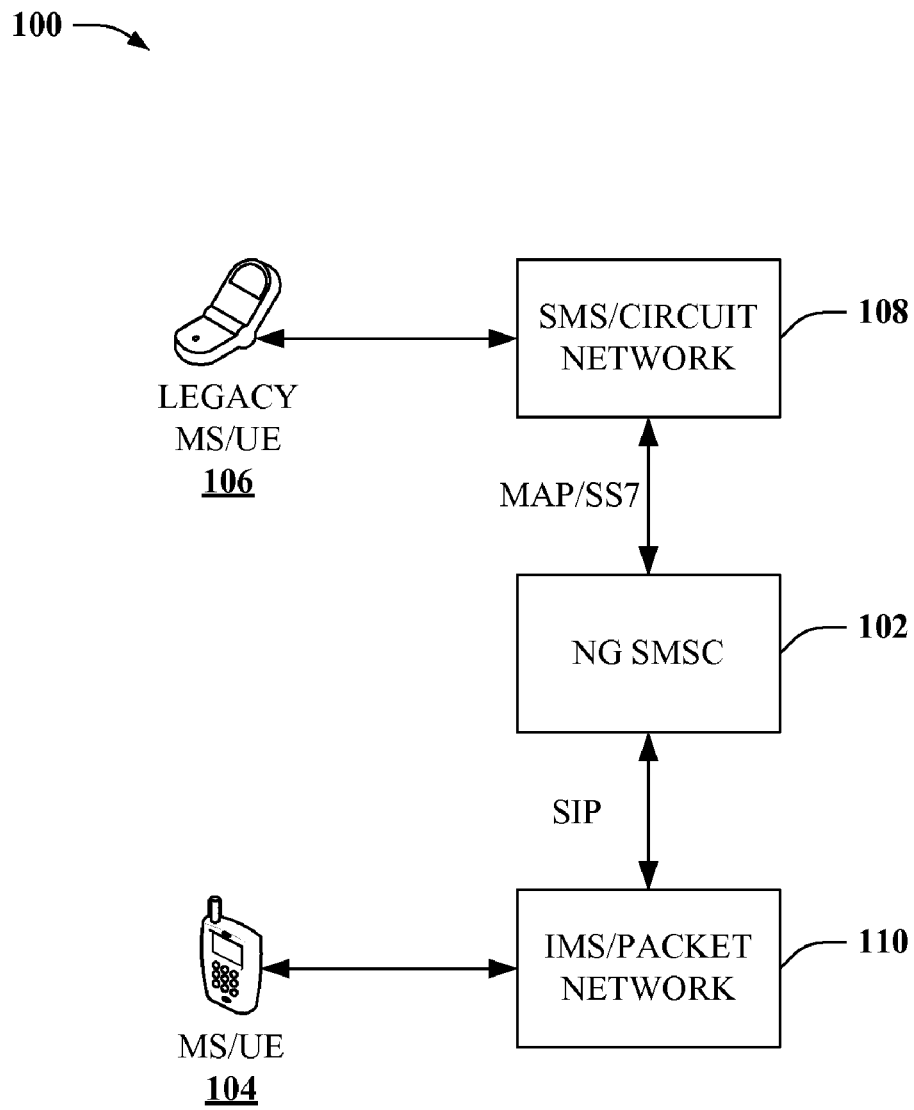
FIG. 1 depicts a block diagram of a sample system for integrating legacy short message service (SMS) and next generation (NG) IP multimedia subsystem (IMS) networks according to aspects of the subject disclosure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Legacy short message service (SMS) components have been integrated for a number of years in mobile communication circuit-switched networks and have provided text-based communication among subscribers, network components, and/or application vendors. Such messaging is limited to circuit-switched communication, however, with some exceptions based on overlaid general packet radio service network components. Recent developments have introduced IP multimedia subsystem (IMS) components amongst relatively new packet-switched core networks that can interface with IMS capable devices. IMS components provide efficient access to data networks such as the Internet, utilizing typical IP communication protocols such as the session initiation protocol (SIP). However, legacy SMS messaging typically cannot communicate with IMS devices and vice versa, due to differences in the SIP protocol utilized by IMS networks and the mobile application part (MAP) of the signaling system 7 (SS7) circuit-switched protocol utilized by many legacy SMS networks.

Traditional attempts to resolve the discrepancies in the protocols have met with limited success. One reason for this is that the third generation partnership project (3GPP) standards associated with short message service centers (SMSCs) in SMS networks suggest that such SMSCs should be able to coordinate with both legacy SMS and next generation (NG) IMS location components. However, in practice, this theory has not proved as successful as predicted. One problem is that the 3GPP standards do not address integration of all pre-paid and external application vendor components into the SMS networks. For instance, various service providers integrate application components for charging, location, pre-paid services, or the like, as well as for integration of third party applications (e.g., ring tone applications, data network downloading services, web browsers, media download and player services, and so on) into their SMS networks that are outside of the scope of the 3GPP standards. Accordingly, various service providers have modified SMSCs that are capable of interfacing with such application components. An additional problem is that, although 3GPP assumes the opposite, many SMSCs cannot communicate directly with some IMS network location registries (e.g., a home subscriber server [HSS]).

To compound the foregoing problem, attempts to provide inter-working between IMS and SMS network components have had limited success because they have been focused on modifying the SMSC as suggested by 3GPP. As a result, each SMSC would have to be updated in order to access some IMS location registries and perform typical network routing functions. It could be prohibitively expensive for even a single provider to update each of its' SMSCs accordingly; costs to the mobile industry associated with each provider doing so could be even more prohibitive. In addition, it can take complex software algorithms to provide an interface between SMSCs and some of the currently available IMS location registries as 3GPP assumes. Accordingly, modifications to 3GPP SMSCs to provide such inter-working have been only of limited use.

In addition to the foregoing, 3GPP assumes a location register, for instance a home subscriber station (HSS), in a combined IMS/SMS network can store both SMS subscriber data and IMS subscriber data. The SMS subscriber data can be accessed by legacy SMS components (e.g., an SMSC) via a MAP/SS7 protocol, and by IMS components and an IP-SMS gateway via an IP-based protocol defined by the international engineering task force (IETF) (e.g., Diameter protocol). The main drawback regarding the 3GPP compliant HSS, is that few or none of such devices are actually available commercially. In addition, if such devices were available, existing HLRs would have to be upgraded to the standard-compliant model, at a prohibitive cost to service providers employing legacy HLRs to a large subscriber base.

To address the foregoing problems, the subject disclosure provides for a NG SMSC that can interface directly with components of a legacy SMS network (e.g., a SMSC) and of an IMS network (e.g., service call session control function [S-CSCF]). In addition to the foregoing, the NG SMSC does not require changes to a legacy SMSC or to an S-CSCF of an IMS network to provide inter-working between such IMS/SMS components and networks. Instead, a vendor-specific routing function can receive incoming messages, determine whether a recipient of such message is SMS or IMS, and forward the message accordingly. Specifically, if the recipient is an SMS device the routing function can forward an SMS message to a legacy SMSC for handling as specified by legacy SMS standards. If the recipient is an IMS device, the routing function can forward the SMS message to the NG SMSC for routing, delivery and/or charging functions.

As described, changes to the legacy SMSC are not required to provide IMS/SMS inter-working. A direct benefit of this is that vendors can add or remove NG SMSCs into/from their networks to handle SMS/IMS inter-working as an IMS subscriber base changes. For instance, if a provider has tens of millions of legacy SMS customers, and one hundred thousand IMS customers, it could be prohibitively expensive to upgrade an entire network to handle IMS/SMS inter-working for all messages (e.g., updating all HLRs to standard compliant HSSs, or updating all legacy SMSCs to communicate with currently available IMS-only HSSs). Instead, a single NG SMSC can be added to handle all SMS to IMS messages and IMS to SMS messages. For instance, an SMS routing component of the provider's network can forward SMS messages destined to any of the hundred thousand IMS users to one or a small number of NG SMSCs for handling. IMS messages bound to SMS subscribers can be received by the NG SMSC and forwarded to the legacy SMS for standard routing and charging, without requiring updates to the legacy SMSCs that serve the tens of millions of legacy SMS subscribers. Accordingly, service providers can simply add the NG SMSC as the IMS subscriber base justifies, rather than overhauling the existing network to provide legacy SMSC functionality assumed by 3GPP but not typically implemented in such SMSCs.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of a sample system 100 for integrating legacy SMS and NG IMS networks according to aspects of the subject disclosure. In addition, the system 100 can be implemented without changing legacy SMSC functions and protocols. System 100 can include a NG SMSC 102 that can receive MAP SS7 SMS messages and SIP MESSAGEs, and convert such messages from a MAP SMS protocol to a SIP protocol and vice versa. Accordingly, the NG SMSC 102 can inter-connect components of an SMS/circuit-switched network 108 and components of an IMS/packet-switched network 110. As a result, data can be transmitted from and routed between legacy mobile devices/user equipment (MS/UE) 106 and NG MS/UE 104.

SMS/circuit-switched network 108 can include any suitable circuit-switched mobile network that includes SMS capability (e.g., a second-generation [2G] global system for mobile communication [GSM] network). SMS/circuit-switched network 108 can also include 2G SMS networks that include an overlaid data network environment, such as a general packet radio system (GPRS) architecture or enhanced data rate for GSM evolution (EDGE) architecture, or the like. These networks are typically governed by various standards that provide communication protocols (e.g., MAP, SS7) defining electronic communication requirements between components of such networks. The IMS/packet-switched network 110 can include any suitable voice and data environment utilizing IMS or like protocols that provide a mobile device interface with IP devices and data networks such as the World Wide Web. Such networks (110) can include universal mobile telecommunication system (UMTS), high speed download packet access (HSDPA) environments, and/or high speed upload packet access (HSUPA) environments, or the like.

In addition, system 100 can provide communication services and interoperability for one or more legacy MS/UEs 106. Such devices (106) are limited to using circuit-switched SMS related protocols (e.g., MAP, SS7) for short message communication. System 100 can also provide communication services and interoperability for one or more NG MS/UEs 104. Such devices (104) can have a client installed which is capable of performing basic IMS functions such as session Internet protocol (SIP) registration, SIP deregistration, and the like. In addition, the device provides a mechanism to convert user text to SMS messages as defined by various suitable standards (e.g., 3GPP). The device (104) can generate a native SIP MESSAGE and/or such device can encapsulate an SMS message within the SIP MESSAGE. The SIP MESSAGE can be routed via an IMS network when the device (104) is in a third generation (3G) environment. (Such device 104 can also de-capsulate an SIP-encoded SMS message and present such message to a user as text). When in a 2G environment, the device (104) can send and receive SMS via legacy mechanisms, in a substantially similar manner as the legacy MS/UE 106.

In addition to the foregoing, NG SMSC 102 can perform various charging and routing functions in both the SMS and IMS network environments (108, 110). For instance, NG SMSC 102 can access both a home location register (HLR) (or, e.g., a vendor-specific SMS location registry such as a master subscriber database) and/or a currently available IMS-only home subscriber station (HSS) (not depicted), or e.g., a 3GPP standard HSS that includes both HLR data and IMS subscriber data. Accordingly, system 100 can locate legacy MS/UE 106 on an SMS network as well as IMS MS/UE 104 either on an SMS network or on an IMS network, without requiring changes to currently available network components (108, 110) to carry out charging and location/routing functions. Thus, system 100 can provide an efficient interface between IMS and SMS networks (108, 110) with minimal or no changes to current network components and protocols.

Figure 2:
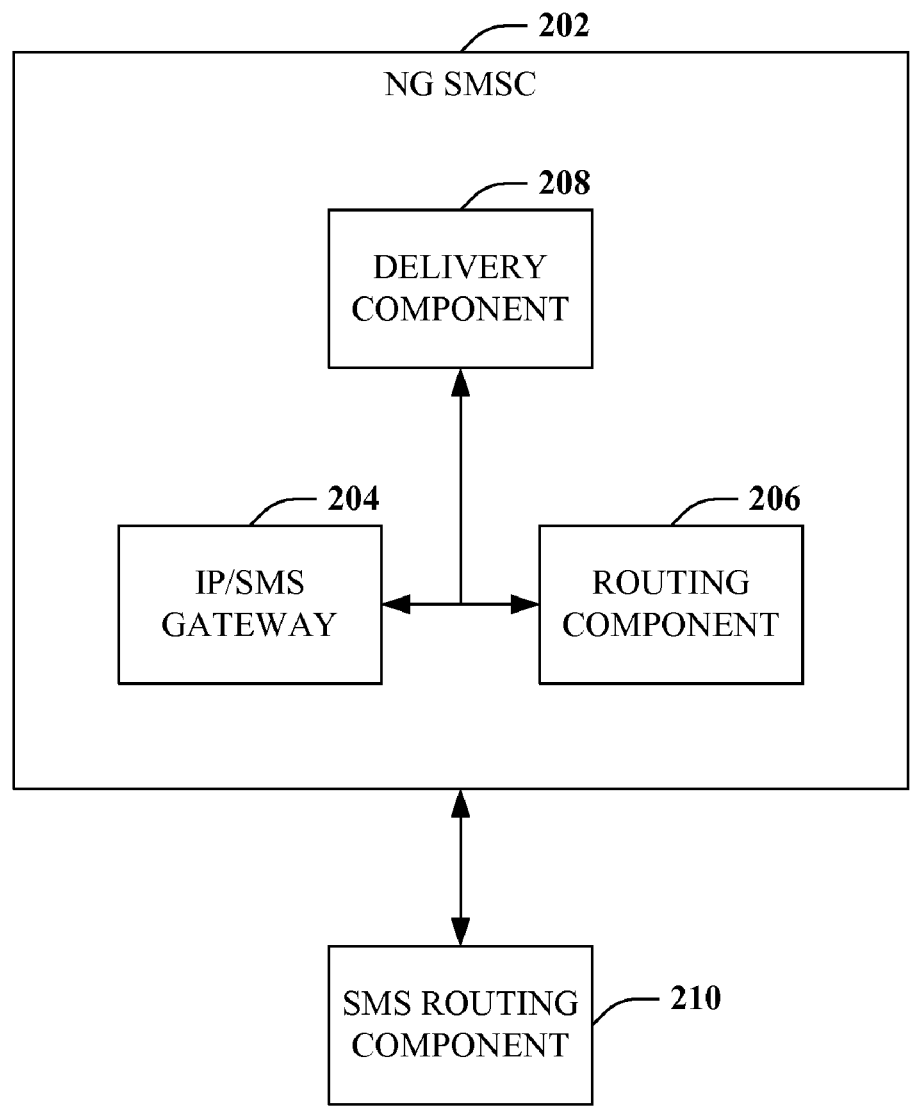
FIG. 2 depicts a block diagram of an example NG SMS control center according to additional aspects.

FIG. 2 depicts a block diagram of an example NG SMSC system 200 according to additional aspects of the subject disclosure. NG SMSC 202 can provide an interface between legacy SMS networks and NG IMS networks as described herein. For instance, an IP/SMS gateway 204 can receive SIP protocol messages as well as MAP SMS protocol messages and provide a conversion between such protocols as discussed with respect to FIG. 1, supra. For instance, IP/SMS gateway 204 can receive a SIP MESSAGE and convert such message to MAP SMS if a recipient of such message is a SMS subscriber. The converted MAP SMS message can be forwarded to components of a SMS network (e.g., SMS routing function 210 or to a legacy MSC—not depicted) for further handling.

In addition to the foregoing, NG SMSC 202 can include a routing function 206 that can apply communication policies to IMS and/or SMS messages. For instance, routing function 206 can determine whether a subscriber is associated with a pre-paid messaging and/or data system or post-paid system. Accordingly, routing function 206 can perform debiting/crediting or charging and billing functions, respectively, associated with SMS or IMS messaging. As a specific example, routing function 206 can generate CDRs associated with SIP and/or IMS messaging for pre-paid or post-paid systems, as suitable.

Further, NG SMSC 202 can include a delivery function 208 that can determine location information associated with a message originator and message target. For instance, if the originator or target is an SMS subscriber, an HLR can be referenced to determine a location and routing information associated with an SMS device. If the originator or target is an IMS subscriber, delivery function 208 can also reference an HSS (not depicted) to determine location and routing information associated with such IMS device(s). In addition, delivery function 208 can provide typical store and forward capability for IMS messages or SMS messaged targeted to a legacy device or a NG-type device. Accordingly, IMS and SMS inter-connectivity can be provided without modifying core network components (e.g., a legacy SMSC or a S-CSCF) to enable such components to access location registries of disparate networks operating on disparate communication protocols.

System 200 can also include an SMS routing component 210 that can receive an SMS message and determine location information associated with a sender and a recipient of such message. The SMS routing component 210 can forward the message to an SMS network for routing if the recipient device is an SMS device or an IMS/SMS device coupled with a legacy SMS network. If the recipient is an IMS or IMS/SMS device coupled with an IMS network, the SMS routing component 210 can forward the message to NG SMSC 202. NG SMSC 202 can perform conversion to SIP protocol, and location, routing and charging functions associated with such message, as discussed above. Accordingly, system 200 can bypass NG SMSC 202 for SMS to SMS messages, utilizing only the SMS routing component 210 and the SMS network, and can therefore provide SMS/IMS inter-working without requiring changes to standardized SMS or IMS network components.

Figure 3:
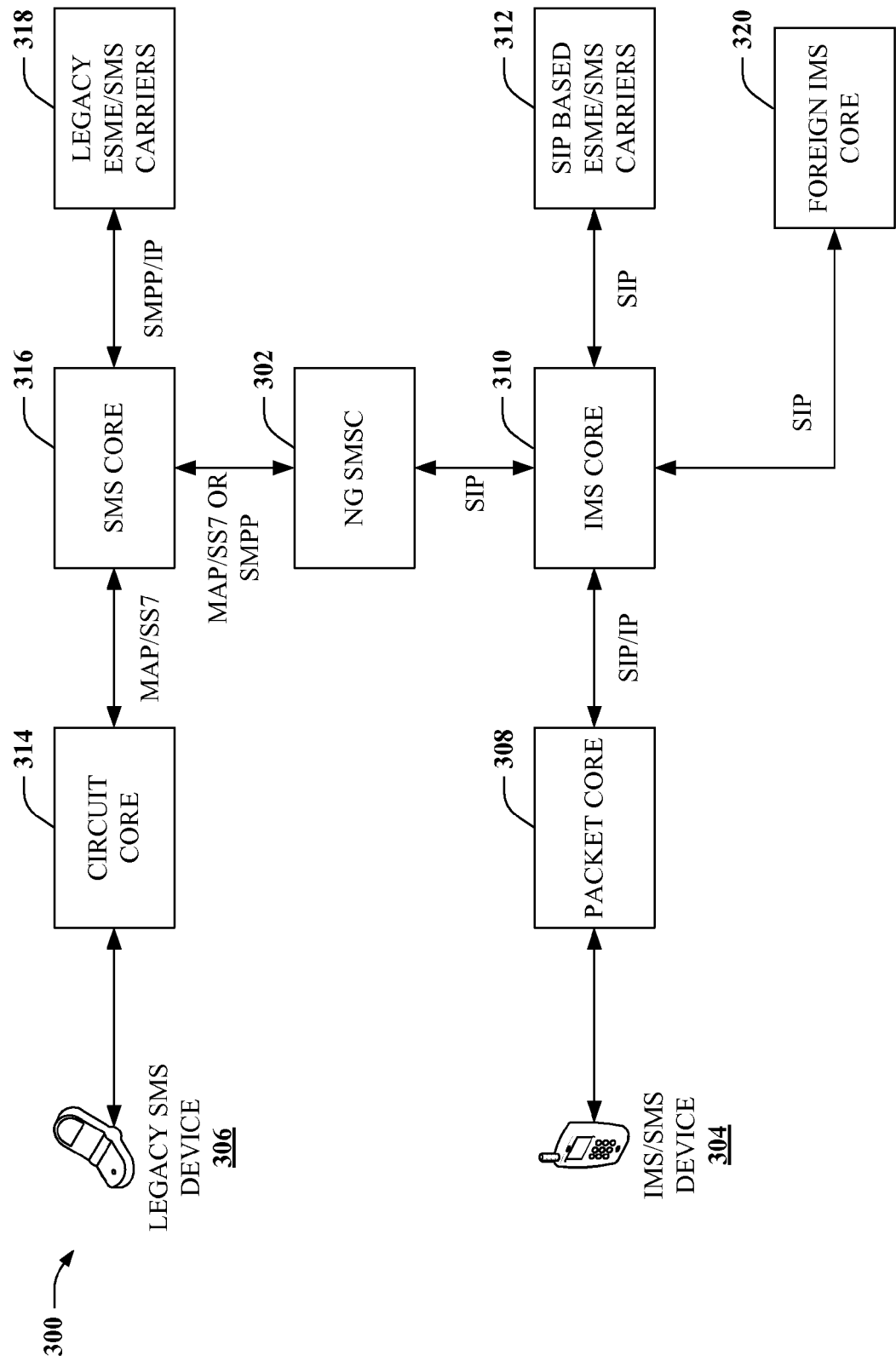
FIG. 3 illustrates a block diagram of a sample system that provides an interface between SMS and IMS networks and subscribers.

FIG. 3 illustrates a block diagram of an example system 300 that can provide SMS/IMS inter-working for SMS and IMS networks by way of an NG SMSC 302. In addition, system 300 can further provide SMS/IMS inter-working to external short message entities (ESMEs) (e.g., SMS or IMS application providers). Accordingly, such system 300 can incorporate external service providers who utilize SMS (e.g., MAP/SS7 or short message peer-to-peer [SMPP]) and/or IMS to provide services to subscribers (304, 306).

System 300 can inter-connect an IMS/SMS device 304 (e.g., an IMS-only device or an IMS+SMS capable device) coupled to a packet-switched core network 308 with a legacy MS/UE 306 coupled to a circuit-switched core network 314. Specifically, NG SMSC 302 can provide an interface between an SMS core 316 and an IMS core 310, including facilitating protocol conversion, charging, location and/or routing functions, or the like, associated with delivering SMS messages and/or SIP data between SMS and IMS devices (304, 406). In addition, NG SMSC 302 can provide SMS/IMS conversion for legacy ESME/SMS carriers (e.g., application providers) interfaced with the SMS core network 316. For instance, an application (318) that provides specialized SMS messaging for ring tone applications on the legacy MS/UE 306 typically would not be able to provide such service to an IMS/SMS device (304) coupled with the packet core network 308. However, NG SMSC 302 can perform conversion and location/routing functions as described herein, and therefore can convert SMS messages generated by the legacy ESME carrier 318 to an IMS/SMS device 304, and vice versa. Accordingly, system 300 can facilitate providing such service to devices (304) coupled to the packet core network 308.

According to further aspects, system 300 can also couple SIP-based ESME carriers 312 and provide an interface between such carriers 312 and a legacy SMS device 306. Thus, the SIP-based ESME carrier 312 can provide suitable services to such legacy devices (306) by way of the conversion, location and routing functions performed by NG SMSC 302. In such a manner, carriers (312, 318) can provide services to a larger population of subscribers without having to incorporate protocol conversions into their own systems. In addition to the foregoing, system 300 can include a foreign IMS core network 320 coupled with the IMS core network 310. Such foreign network (320) can include, for instance, an IMS network of an external mobile service provider. Such provider (320) can interface with a local IMS core 310 via standard protocols (e.g., SIP) and receive SMS/IMS conversion services by way of the NG SMSC 302 as described herein. Accordingly, the foreign provider (320) can offer IMS-based services to legacy SMS devices (306) via such connection to the IMS core 310. Although not depicted, a foreign SMS core network could interface with the SMS core network 316 and provide services to IMS/SMS devices (304) as described above. Thus, system 300 can provide SMS/IMS inter-working for various SMS and/or SIP based application and/or communication service providers by way of an NG SMSC 302 as described herein.

Figure 4:
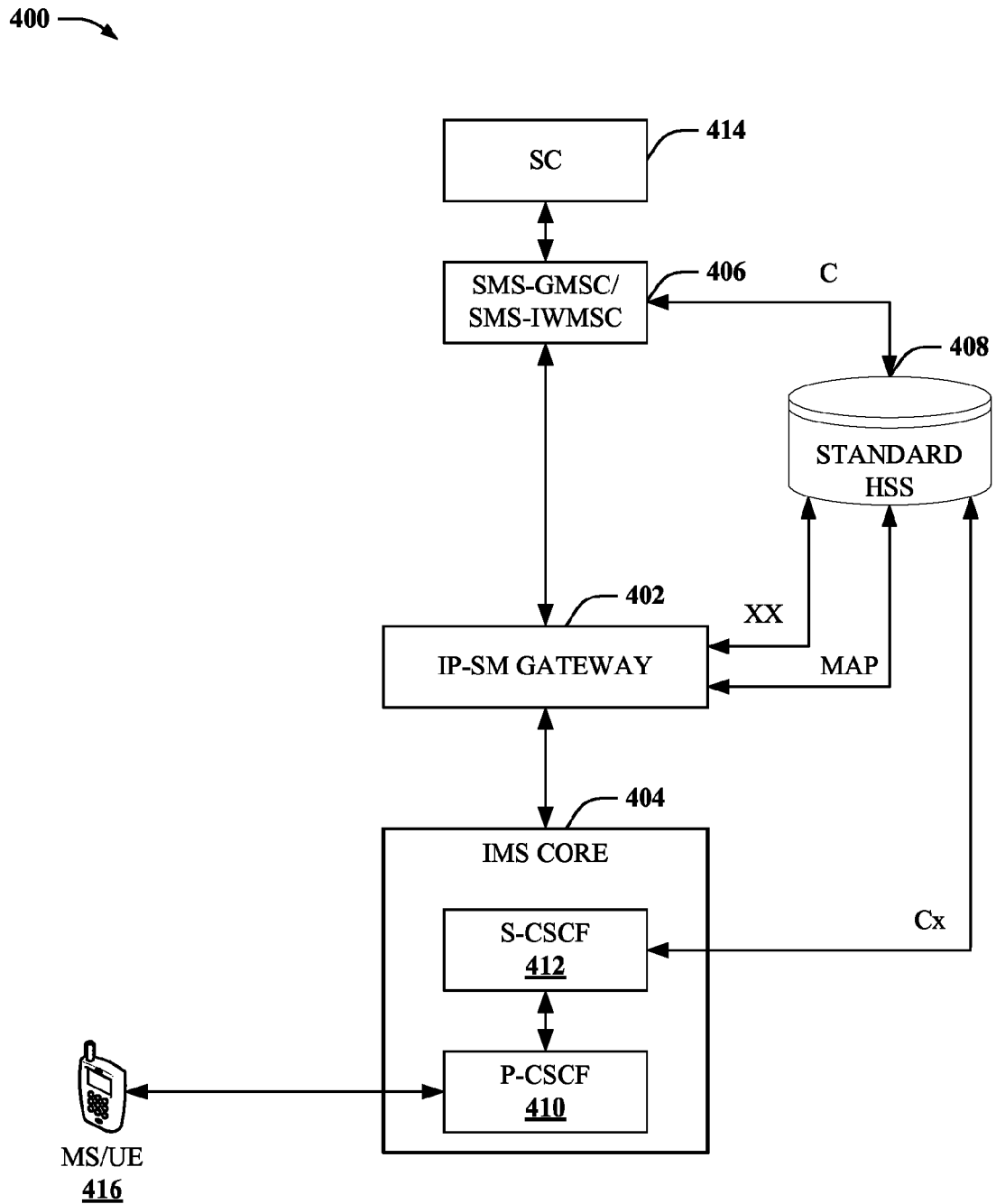
FIG. 4 depicts a block diagram of an example system that provides SMS/SIP conversion.

FIG. 4 depicts a block diagram of an example system 400 that provides SMS/SIP conversion. System 400 includes an IP-SM Gateway 402 that can provide SMS/IP conversion (e.g., conversion from SIP to MAP SS7 and vice versa). Specifically, system 400 can receive SIP MESSAGEs from components of an IMS core network 404 and SMS messages from components (406, 418) of an SMS network. The messages (SIP/SMS) can be converted from one protocol to the other, and forwarded to the other network (404, 406/418). System 400 also assumes some interconnectivity between an SMS-GMSC/SMS-IWMSC 406 and a 3GPP standard HSS 408 associated with the IMS core 404 for location and routing services. For instance, if an SMS message is received and directed to an IMS device (416), system 400 assumes that the SMS-GMSC/SMS-IWMSC 406 can determine location of the target device (416) by accessing HSS 408. However, typical SMS-GMSC/SMS-IWMSCs (406) do not have the capability to utilize protocols required to interface with an IMS-only HSS (408), e.g., as currently implemented in many current IMS networks, and consequently would require additional software to provide such interface with such an IMS-only HSS (408). Accordingly, although system 400 can provide SIP/SMS conversion, it has inherent bottlenecks associated with querying for location and routing information of IMS network devices (416). Various embodiments describing an NG SMSC herein provide mechanisms for overcoming these bottlenecks and providing a low-cost yet efficient solution for interfacing SMS and IMS systems.

Figure 5:
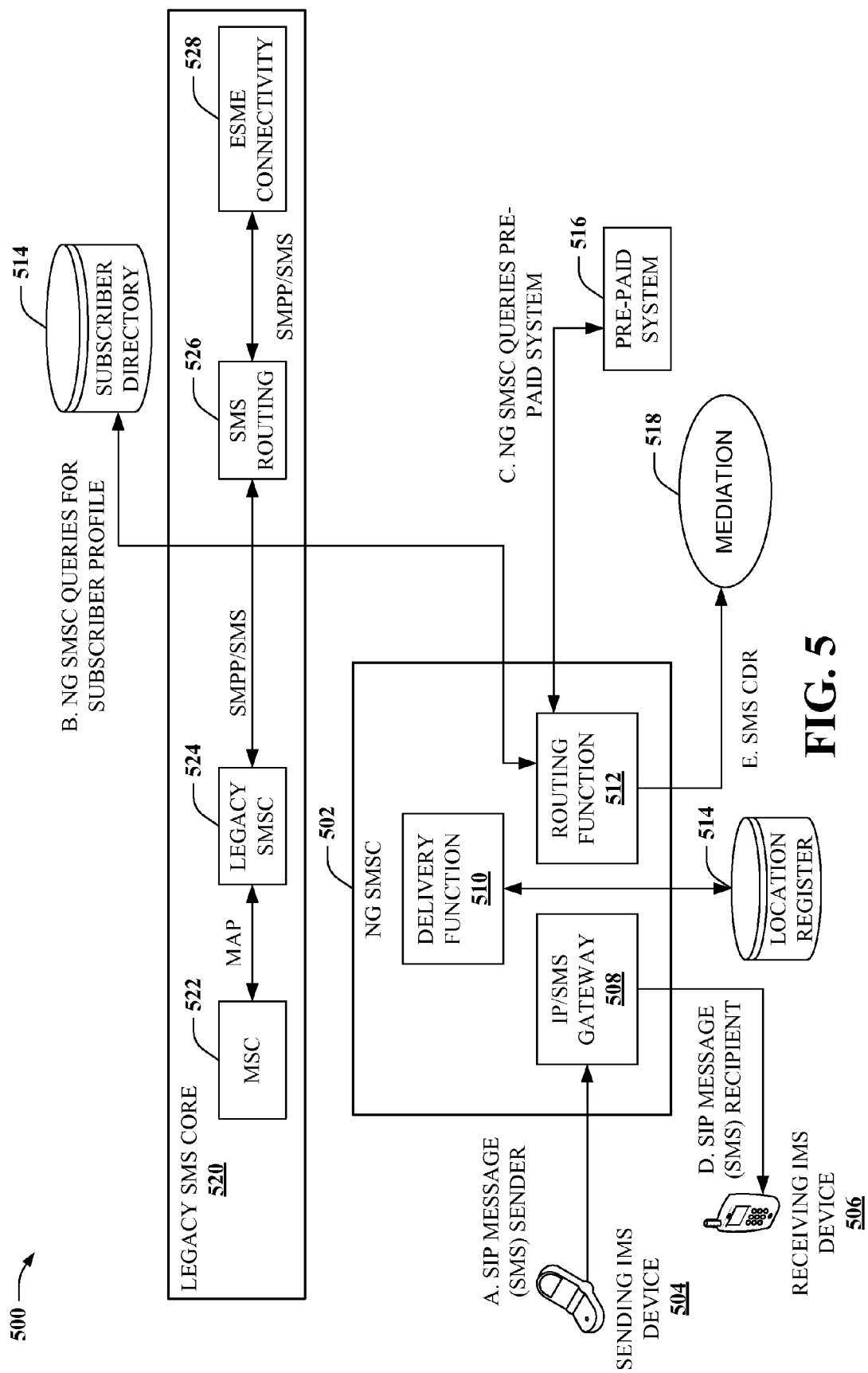
FIG. 5 illustrates a block diagram of a sample system that can deliver an SIP MESSAGE from a first IMS subscriber to a second IMS subscriber according to aspects.

FIG. 5 illustrates a block diagram of a sample system 500 that includes an NG SMSC 502 that can deliver an SIP MESSAGE from a first IMS subscriber (504) to a second IMS subscriber (506) according to various aspects. MS/UE 504 can be any suitable IMS capable mobile communication device. Such device (504) can send an SIP MESSAGE that is forwarded (e.g., by an S-CSCF) to the NG SMSC 502. The SIP MESSAGE could include native text, or can include an SMS message encapsulated into such SIP MESSAGE.

If the SIP MESSAGE includes an SMS message encapsulated into SIP protocol, IP/SMS Gateway 508 can receive the SIP MESSAGE, de-capsulate the SMS message from the SIP format, and forward the de-capsulated SMS message to routing function 512. Routing function 512 can then determine whether a recipient (506) of the message is coupled with an IMS or SMS network (not depicted). For instance, routing function 512 can query a subscriber master directory 514 associated with the receiving device 506 identified in the SIP/SMS message to determine a domain (e.g., legacy or IMS) of the target device (506). Routing function 512 can then query pre-paid system 516 to determine whether the sending IMS device 504 or receiving IMS device 506 are pre-paid subscribers.

Once a domain is determined for the device (506), delivery function 510 queries a location register 530 specific to such domain. For instance, an HLR can be queried for a legacy domain device (506). In addition, an HSS, such as an IMS-only HSS or a 3GPP standard HSS, can be queried for an IMS domain device (506). A reply to this query from the location register 530 can indicate, for instance, that the receiving IMS device 506 is connected to an IMS network (e.g., by way of the S-CSCF) and provide routing information required to deliver such message to the device (506). The SIP MESSAGE can then be routed to the receiving device (506), and an SMS CDR can be generated and sent to a network mediation component 518 for charging and billing functions.

If a receiving IMS device 506 cannot be found on the IMS network, delivery function 510 can store the SIP/SMS message. When the IMS device 506 later registers onto the IMS network, a component of the IMS network (e.g., an HSS or an S-CSCF) can update the delivery function 510 with the location and routing information for such device (506). Once the target device and its concurrent serving network is identified, delivery function 510 can forward the SIP/SMS message to the receiving device 506 and then generate the SMS CDR as described above. Such a function is typically termed a 'store and forward' capability, and enables a message to be stored by a network component (502) and forwarded later. For instance, if a receiving device (506) cannot be found (e.g., turned off), the message can be stored and forwarded once the device (506) registers onto the IMS network at a later time (e.g., when the device is powered on and registers with a local base station).

According to alternative embodiments, an SIP MESSAGE that includes native text can be sent by the first IMS subscriber 504. Based upon initial filter criteria, an S-CSCF (not depicted) can forward this SIP MESSAGE to the NG SMSC 502 for processing. In such case, IP/SMS gateway 508 can receive the message. Routing function 512 can determine a domain of a receiving device 506 identified in the message by accessing subscriber directory 514. If IMS capable and on an IMS domain, the SIP MESSAGE can be forwarded to such IMS target device as described above. If the target device is on an SMS domain, the SIP MESSAGE can be converted to SMS format and forwarded to an appropriate serving MSC to deliver the message.

It should be appreciated that NG SMSC 502 can connect to a legacy SMS core network 520 (and, e.g., components thereof 522, 524, 526, 528), but for an IMS sender (504) and IMS recipient (506) such components (522, 524, 526, 528) need not be referenced. Optionally, however, an HLR can be queried by delivery function 510 to determine the location information of the receiving SMS device (not depicted). Particularly, if the receiving device 506 registers onto an SMS network (e.g., MSC 522), the HLR will have the necessary location and routing information required to forward a message to such device (506).

Figure 6:
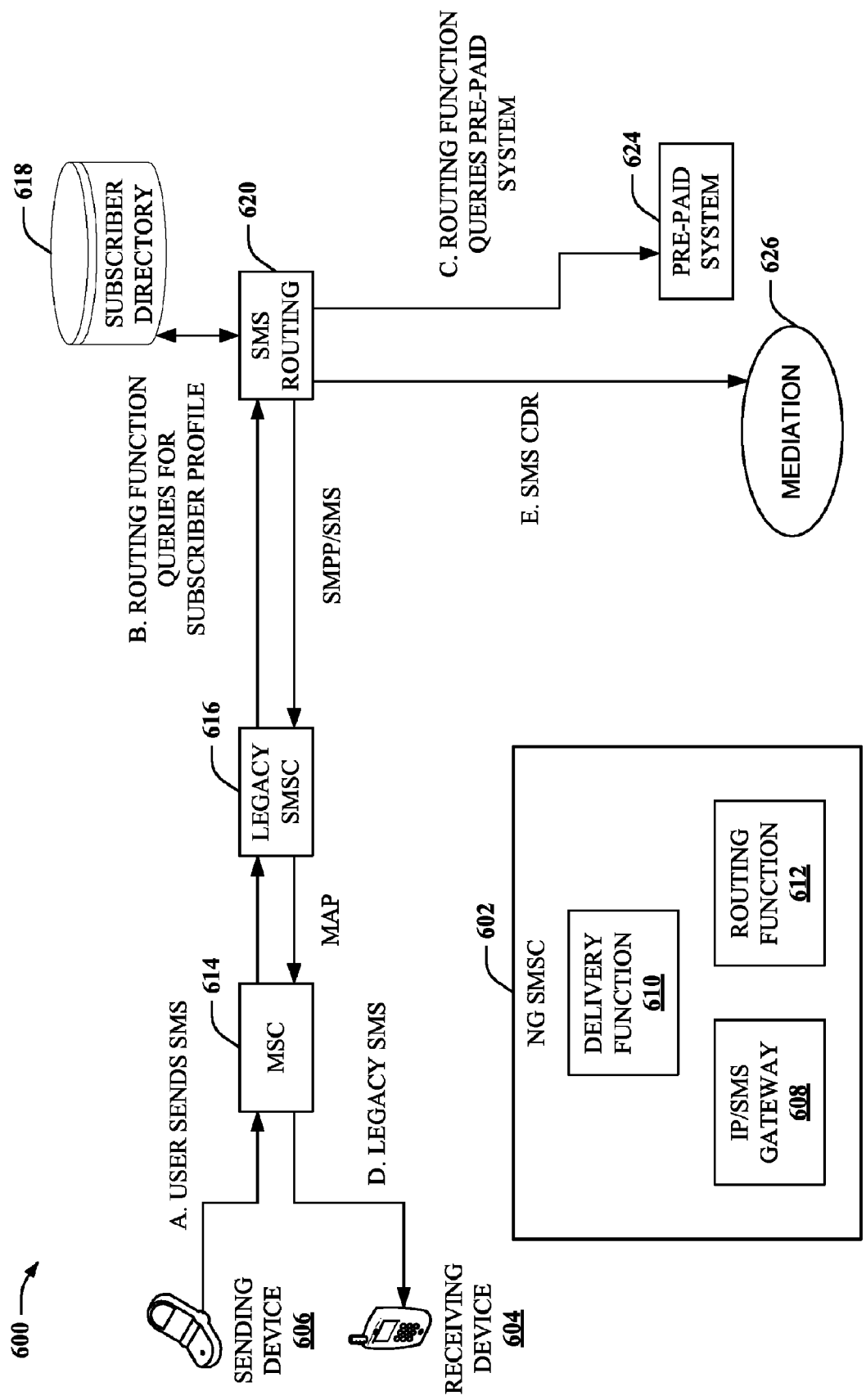
FIG. 6 depicts a block diagram of an example system that can deliver an SMS message between legacy SMS subscribers according to further aspects.

FIG. 6 depicts a block diagram of an example system 600 that can deliver an SMS message between legacy SMS subscribers (604, 606) according to further aspects. Sending device 606 can generate and forward an SMS message to an MSC 614 associated with a GSM and/or SMS network. The MSC 614 can forward the SMS message to components of an SMS network (616, 620). A subscriber directory can be referenced by an SMS routing component 620 to determine domain and charging information associated with a receiving device (604) specified within the SMS message. SMS routing function 620 can then query a pre-paid system 624 to determine appropriate charging and billing functions. Subsequently, SMS routing 620 can forward the SMS message to an appropriate SMSC (616) currently serving the receiving device. Such SMSC (616) can reference an HLR (not depicted) to identify a current serving MSC (614) associated with the receiving device 604. Such serving MSC (614) then routes the SMS message to the device (604). SMS routing function 620 can generate and forward an SMS CDR to a mediation component 626 for charging and billing functions. It should be appreciated that although legacy SMS 616 can communicate with an NG SMSC 602 (and components 608, 610, 612 thereof) to interface with an IMS system (not depicted), such is not required for legacy SMS to SMS data transfer. Accordingly, system 600 can allow for conventional SMS functionality as well as provide an interface to IMS networks without requiring changes to standard SMS network protocols.

Figure 7:
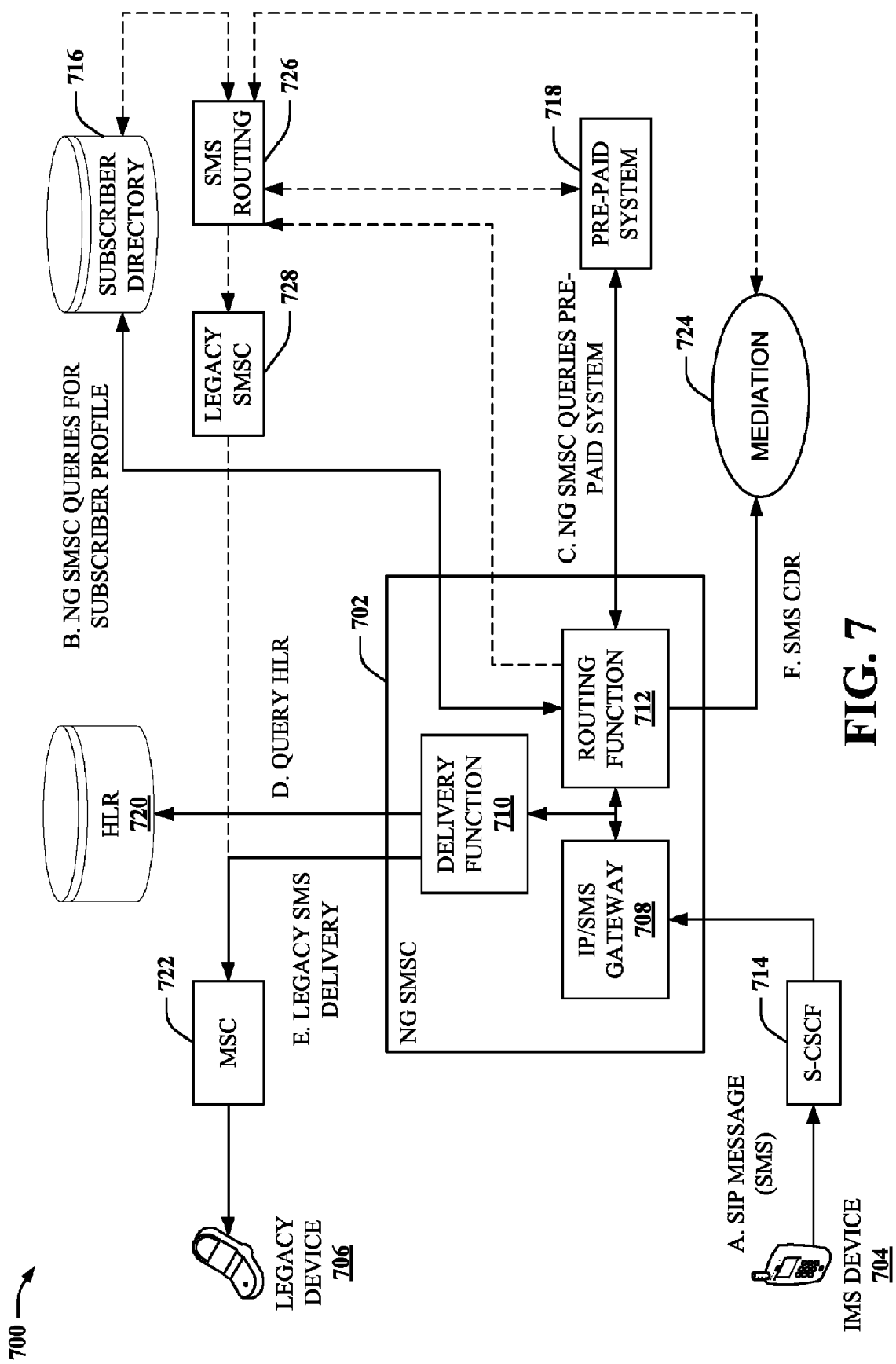
FIG. 7 depicts a block diagram of an example system that can deliver an SIP MESSAGE from an IMS subscriber to a legacy SMS subscriber.

FIG. 7 depicts a block diagram of an example system 700 that can deliver an SIP MESSAGE from an IMS subscriber (704) to a legacy SMS subscriber (706). Specifically, system 700 can include an NG SMSC 702 that can interface components (722, 728 726) of an SMS network with components (714) of an IMS network. Further, NG SMSC 702 can provide protocol conversion, location, routing and charging functions associated with mobile communication between such networks.

As a particular example, an IMS device 704 can encode an SMS message into an SIP MESSAGE and forward such message to an S-CSCF 714 of an IMS network. S-CSCF 714 can then forward the SIP MESSAGE to the NG SMSC for location, routing and/or charging functions, as described herein. Specifically, IP/SMS Gateway 708 can convert the SIP MESSAGE to SMS (e.g., de-capsulate the SMS message encoded within the SIP MESSAGE for transmission using MAP SMS protocols) if a target device is determined to be located on an SMS network. Routing function 712 can then query a subscriber directory 716 to determine domain and charging information associated with a target device (706). According to at least one embodiment, once the domain information is obtained, routing function 712 can then perform charging functions by referencing a pre-paid system 718 to determine whether the sending device (704) or receiving device (706) are pre-paid or post-paid subscribers. If the domain information specifies that target device 706 is a legacy device, delivery function 710 then queries HLR 620 to determine location and routing information for such device. The message is then sent to an appropriate serving MSC 722 for delivery to the receiving device 706. Routing function 712 can then send an SMS CDR to mediation 724 for billing and charging purposes.

According to at least one alternative embodiment (indicating by the dashed arrows associated with SMS routing function 726 and legacy SMS 728), routing function 712 queries subscriber directory 716 to determine device domain information, as described above. If such device (706) is an SMS device, the SMS message can be converted from SIP to MAP by IP/SMS Gateway 708, and then from MAP to SMPP SMS protocol by routing function 712, and then forwarded to a legacy SMS routing function 726. SMS routing function 726 can then reference the subscriber directory 716 to determine an SMSC suitable for delivering the message to the receiving device (706). The SMSC (728) queries HLR 720 to find an appropriate serving MSC 722 for the target device 706. The SMS routing function 726 can do the pre-paid system (718) check, forward the message to a legacy SMSC 728 for routing to the MSC 722 and receiving device 706. Additionally, the SMS routing function 726 can also generate the SMS CDR and deliver such CDR to mediation 724 for billing and charging purposes. It should be appreciated that such functions taken by the SMS routing function 726 can be substantially similar to that conducted by such function (726) in legacy SMS communication, as described in FIG. 6, supra. Accordingly, no protocol or logic changes are required to implement the alternate embodiments described above. Therefore, system 700 can provide an effective, efficient and low cost interface for sending SIP MESSAGEs to SMS devices, as described herein.

Figure 8:
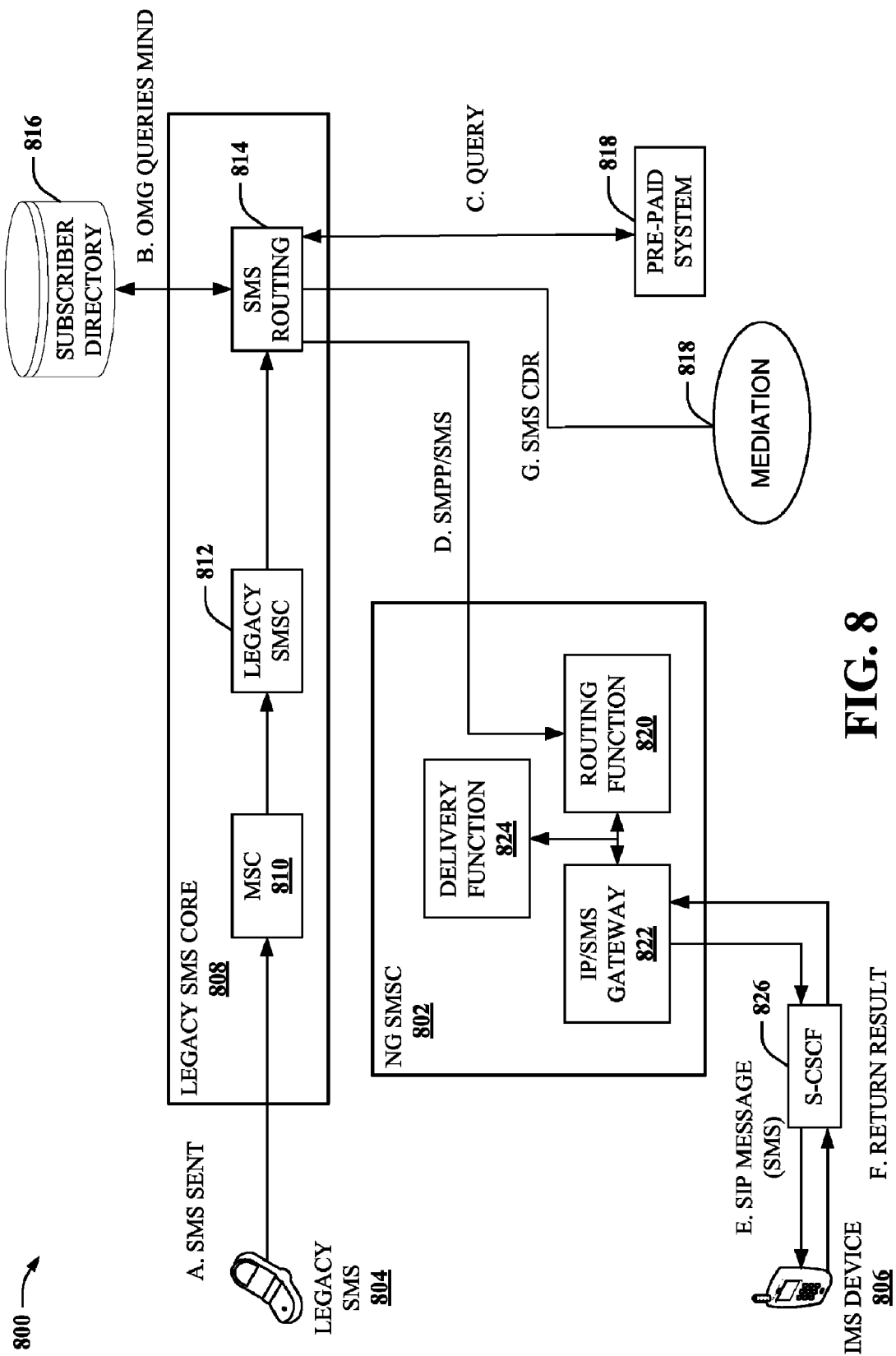
FIG. 8 depicts a block diagram of an example system that can deliver a MAP SMS message from a SMS subscriber to an IMS subscriber.

FIG. 8 depicts a block diagram of an example system 800 that can deliver a MAP SMS message from an SMS subscriber (804) to an IMS subscriber (806) according to one or more aspects. A legacy SMS device 804 can generate an SMS message targeting an IMS device 806, and forward such SMS message to an MSC 810 within a legacy SMS core network 808. The MSC 810 can forward the SMS message to a legacy SMSC 812 for further handling. The legacy SMSC 812 can forward the SMS message to an SMS routing component 814, which queries a subscriber directory 816 to determine domain and charging information associated with the target IMS device 806. If the target device 806 is an IMS domain device, then SMS routing component 814 can also receive an address for NG SMSC 802 for further routing on the IMS domain. The SMS routing component 814 can then perform a pre-paid system 818 query to determine applicable charging rules, as described herein and/or known in the art, and forward the SMS message to the NG SMSC 802.

NG SMSC 802 can receive the SMS message at routing function 820, which can convert the message from SMPP protocol MAP/SMS protocol. Under some embodiments, routing function 820 will not do any pre-paid system queries since it was done by SMS routing 814. (As an alternative, routing function 820 can perform the pre-paid system query instead of SMS routing 814). Delivery function 824 can then query an HSS (e.g., an IMS-only or a 3GPP standard HSS, not depicted) to identify an S-CSCF 826 coupled to the target IMS device 806. Then, the SMS message can be encapsulated into a SIP MESSAGE (e.g., by IP/SMS Gateway 822) and forwarded to the S-CSCF 826 identified by delivery function 824. S-CSCF 826 can then forward the SIP MESSAGE to IMS device 826, which can respond with a result (e.g., failure, success). The return result can be forwarded to the NG SMSC 802 for conversion to SMS and/or SMPP protocol and delivery to the SMS routing component 814, which can generate an SMS CDR and forward such CDR to mediation 818 for billing purposes. (As an alternative, the return result can be processed by routing function 820, which can generate the SMS CDR instead of the SMS routing function 814). As described, system 800 can provide a low-cost and effective integration between existing IMS and SMS networks with minimal if any changes required to such existing networks.

The aforementioned systems have been described with respect to interaction between several components, modules and/or mobile network functions. It should be appreciated that such systems and components/modules/functions can include those components or sub-components specified therein, some of the specified components or sub-components, and/or additional components. For example, a system could include NG SMSC 102, SMS routing component 210, IMS core 310 and foreign IMS core 320, or a different combination of these and other components. Sub-components could also be implemented as components communicatively coupled to other components rather than included within parent components. Additionally, it should be noted that one or more components can be combined into a single component providing aggregate functionality. For instance, delivery component 208 can include routing component 206, or vice versa, to facilitate referencing location, routing and/or charging information and forwarding converted SIP MESSAGEs to an SMS network by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 9-13. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Figure 9:
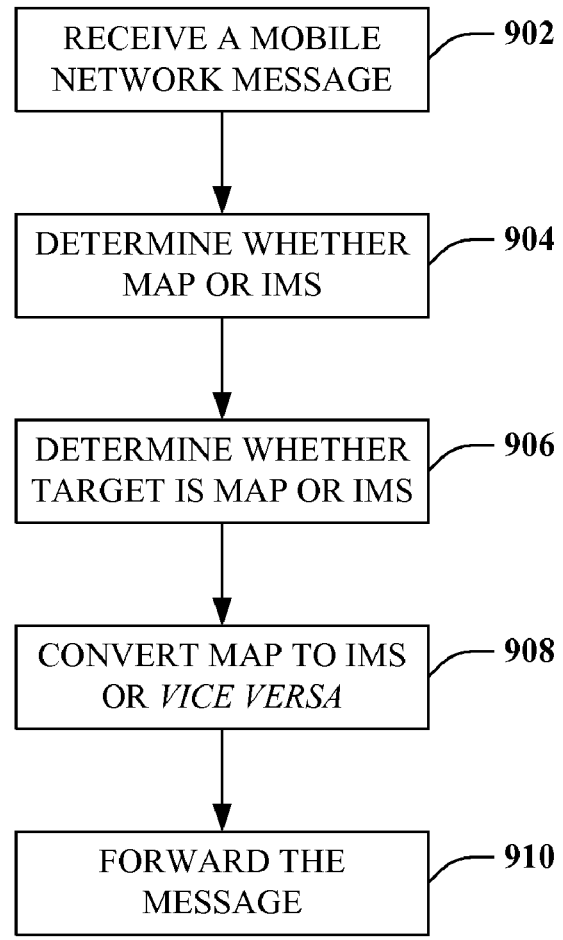
FIG. 9 illustrates a flowchart of a sample methodology for integrating SMS and IMS networks and subscribers according to at least one aspect.

FIG. 9 illustrates a flowchart of a sample methodology 900 for integrating SMS and IMS networks and subscribers according to at least one aspect. At 902, method 900 can receive a mobile network message. At 904, a determination can be made as to whether the received message is in a circuit-switched MAP protocol or packet-switched IMS protocol. At 906, a determination can be made as to whether a target of the message is a MAP associated device or application (e.g., coupled to a legacy SMS network) or an IMS associated device or application (e.g., coupled to an IMS network), and on what network such device/application is currently coupled. At 908, the message can be converted from MAP to IMS or from IMS to MAP (e.g., an IMS message encapsulating a MAP message can be de-capsulated, or an IMS message containing native text can be converted to MAP), as suitable. At 910, method 900 can forward the message to the identified target by way of a network suited to carry the MAP or IMS message (e.g., an SMS or IMS network, respectively). As described, method 900 provides a process for interfacing circuit-switched and packet-switched data/messaging systems without adding additional overhead to such systems, by performing conversion between circuit and packet switched protocols and identifying a location of at least a packet capable device.

Figure 10:
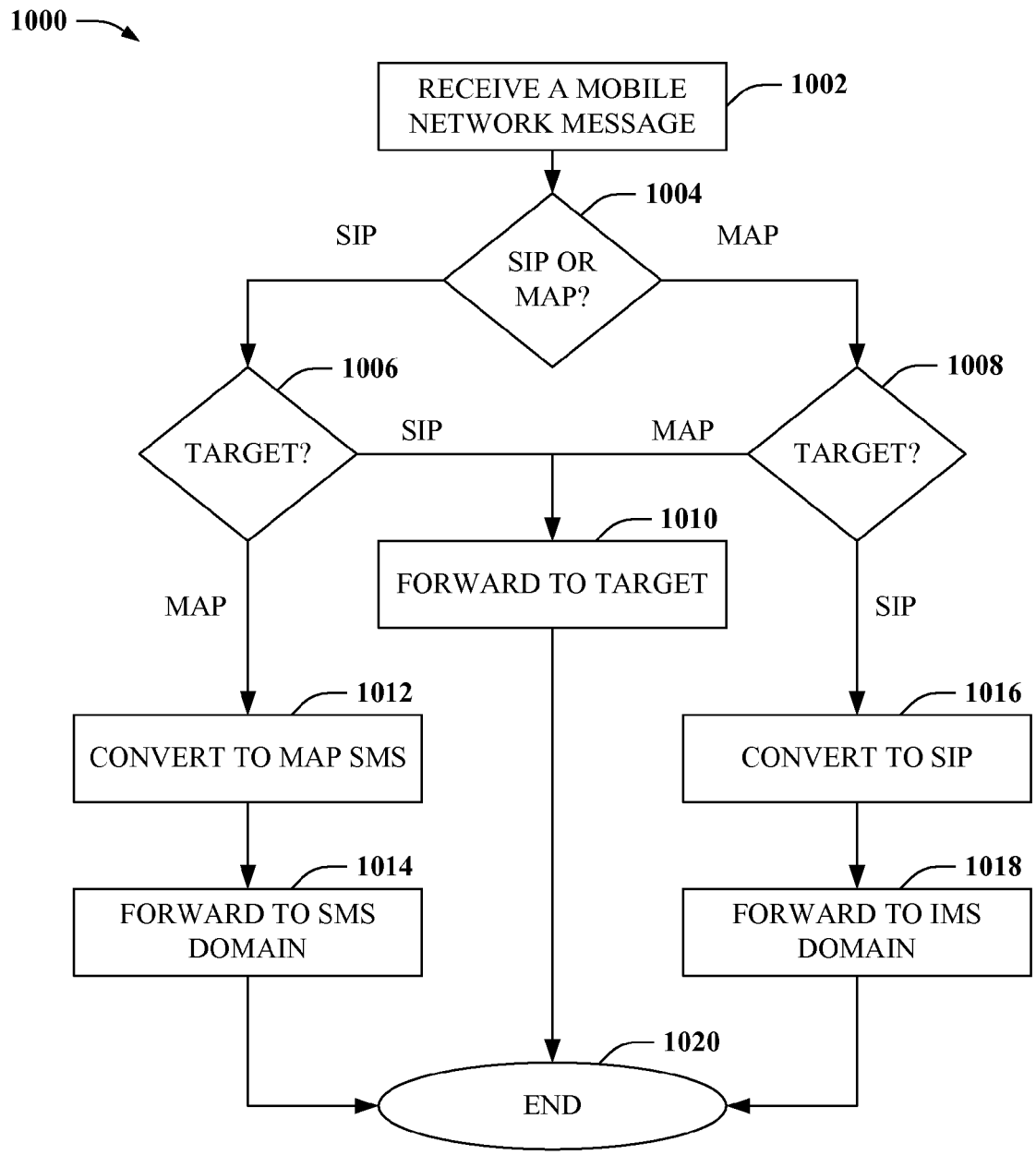
FIG. 10 illustrates a flowchart of an example methodology for converting between SMS MAP and IMS protocols according to aspects.

FIG. 10 illustrates a flowchart of an example methodology 1000 for converting between SMS MAP and IMS protocols according to aspects of the subject disclosure. At 1002, method 1000 can receive a mobile network message. Such mobile network message can be, for instance, in a circuit-switched communication protocol (e.g., MAP SS7 or suitable iterations thereof or of the like) or a packet-switched communication protocol (e.g., SIP or the like).

At 1004, method 1000 can make a determination as to whether the message received at reference number 1002 is a packet protocol message (e.g., SIP) or a circuit-switched protocol message (e.g., SMS). If the message is a packet protocol, method 1000 can proceed to 1006 where a target of the message is determined, and whether such target is coupled to a circuit-switched network or packet protocol network. If the target of the message is also a packet protocol device on a packet capable network (e.g., SIP IMS network), method 1000 can proceed to reference number 1010 where the message is forwarded to an appropriate serving packet protocol network element (e.g., an S-CSCF) coupled with the target device. Method 1000 can then end at 1020. If, at reference number 1006, the target of the message is determined to be an SMS device, method 1000 can proceed to 1012 where the message is converted from packet protocol to circuit-switched protocol (or, e.g., the packet protocol message can be de-capsulated and an embedded circuit-switched message, such as MAP SMS, can be extracted). At 1014, a location registry of a circuit-switched network is referenced to determine location and routing information associated with the target device, and the converted message is forwarded to an appropriate serving circuit-switched network element (e.g., an SMSC) for routing to the target device. Method 1000 can then end at 1020.

If, at reference number 1004, the message is determined to be a circuit-switched protocol message (e.g., SMS MAP), method 1000 can proceed to 1008 where another determination is made as to whether a target device is coupled to a circuit-switched network or a packet-switched network. If the target is coupled to a circuit-switched network, method 1000 can identify location and routing information for such target and forward the message to an appropriate serving circuit-switched network element (e.g., an SMSC) for further handling. Method 1000 can then end at 1020. If the target is determined to be coupled to a packet protocol network at reference number 1008, method 1000 can proceed to 1016 where the received message is converted from the circuit-switched protocol to a packet-switched protocol (e.g., SIP). At 1018, method 1000 can reference a location registry on a packet-switched core network to determine location and routing information associated with the target device, and the converted message can be forwarded to such device. Method 1000 can then end at 1020. As described, a low-cost interface between circuit-switched protocol networks and packet-switched protocol networks is provided for inter-working message and data transfer systems of such circuit and packet switched networks.

Figure 11:
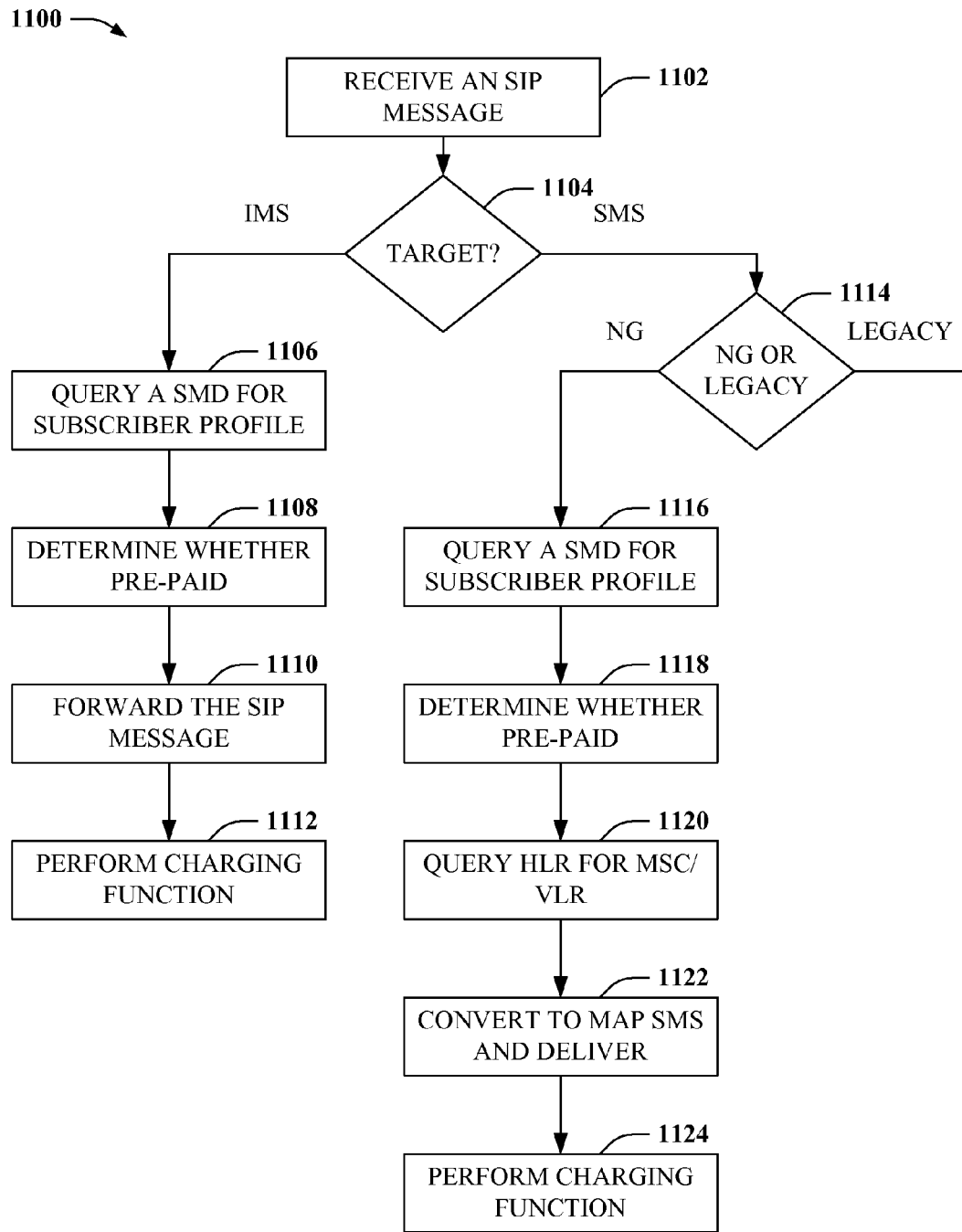
FIGS. 11 and 12 depict a flowchart of a sample methodology for routing a SIP MESSAGE to either a legacy SMS target or a NG IMS target.
Figure 12:
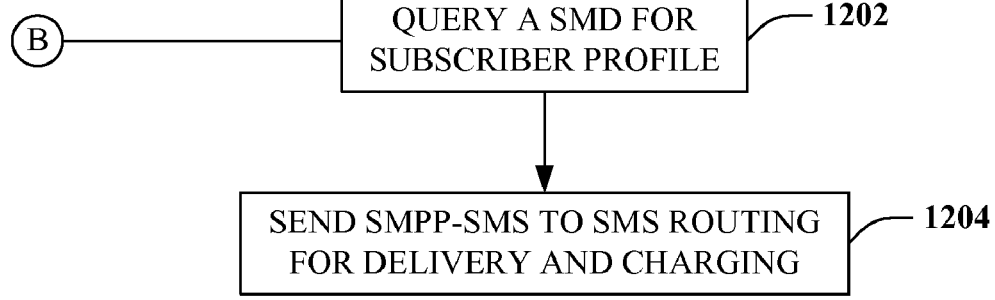

FIGS. 11 and 12 depict a flowchart of a sample methodology 1100/1200 for routing a SIP MESSAGE to either a legacy SMS target or a NG IMS target. At 1102, an SIP MESSAGE can be received. At 1104, a determination can be made as to whether a target of such message is an IMS-type device or an SMS device (e.g., by referencing a subscriber master directory [SMD]). If the target is an IMS-type device, method 1100 can proceed to 1106 where a query of a subscriber master directory (SMD) is performed to find charging information associated with a subscriber profile targeted by the message. At 1108, method 1100 can determine whether a sender or target subscriber is associated with pre-paid or post-paid billing. At 1110, an HSS can be reference to obtain location and routing information and the SIP MESSAGE can be forwarded to the target. At 1112, charging functions for message delivery can be performed.

If, at reference number 1104, the target of the message is an SMS-type device, method 1000 can proceed to 1114 where a determination is made as to whether the message will be delivered directly to an MSC serving the target device, or handled by an SMS routing function. If the message is delivered to the MSC, method 1100 proceeds to 1116 where an HLR is queried to determine charging information associated with a target subscriber profile indicated by the received message. At 1118, method 1100 can determine whether the target or recipient is pre-paid or post-paid. At 1120, method 1100 can query an HLR for a serving MSC/VLR concurrently coupled with the target device. At 1122, the SIP MESSAGE can be converted from SIP protocol to MAP SMS protocol (or, e.g., a MAP/SMS message can be extracted from a SIP MESSAGE encapsulating such MAP/SMS message) and delivered to the serving MSC/VLR. At 1124, charging functions associated with message delivery can be conducted.

If, at reference number 1114, the message is delivered to an SMS routing function for delivery, method 1100 can continue as indicated at 1202 of FIG. 12. Specifically, at 1202 an SMD can be queried to identify a suitable SMS routing component for delivering the message to the target device. At 1204, the SIP MESSAGE can be converted to SMPP-SMS and delivered to the SMS routing component for delivery and charging services typically conducted by such component for SMS-type messaging. Accordingly, a received SIP MESSAGE can be routed to a suitable SIP or SMS target, without requiring changes to legacy SMS protocols.

Figure 13:
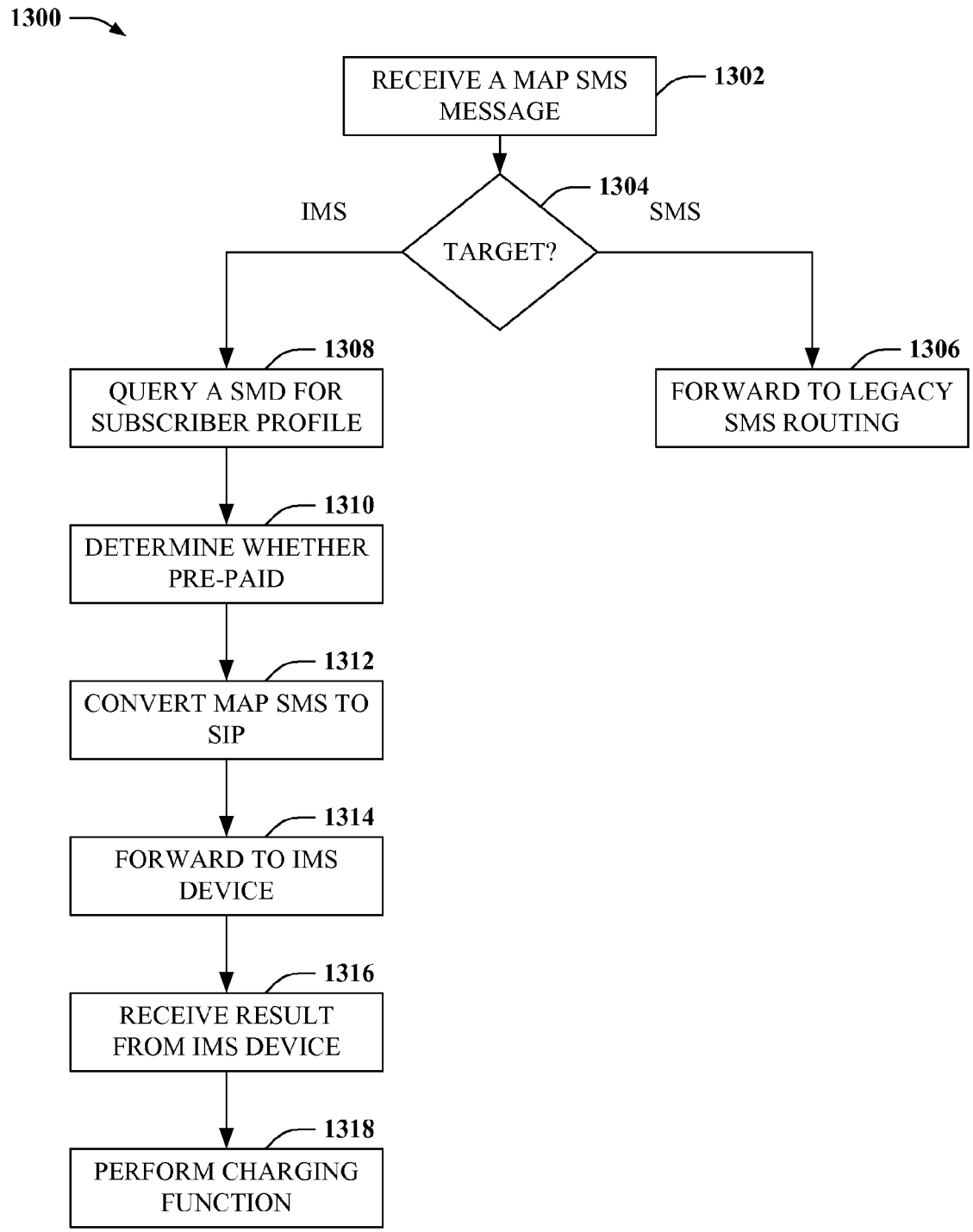
FIG. 13 depicts a flowchart of an example methodology for routing a SMS message to either a legacy SMS target or a NG IMS target.

FIG. 13 depicts a flowchart of an example methodology 1300 for routing a SMS message to either a legacy SMS target or a NG IMS target. At 1302, method 1300 can receive a MAP SMS message. At 1304, a determination can be made as to whether a target of the message is an IMS-type domain or an SMS-type domain (e.g., by referencing the SMD). If the target of the SMS message is an SMS-type domain, method 1300 can proceed to 1306 where the SMS message can be forwarded to a legacy SMSC for typical SMS handling, as described herein and/or known in the art.

If, at reference number 1304, a determination is made that the target of the SMS message is an IMS-type domain, method 1300 can proceed to 1308. At 1308, an SMD can be queried to determine charging information associated with a target subscriber profile identified in the SMS message. AT 1310, a determination can be made as to whether the originating or target subscriber is on a pre-paid billing system or post-paid billing system. At 1312, the MAP SMS message can be converted to SIP format, encapsulating the SMS message. At 1314, the converted SIP MESSAGE can be forwarded to a serving IMS network element coupled with the target device as determined at reference number 1308. At 1316, a result of the message delivery can be received from the IMS device (e.g., failure or success). At 1318, charging and billing functions can be carried out according to pre-paid and/or post-paid policies, and according to the result of the message.

Figure 14:
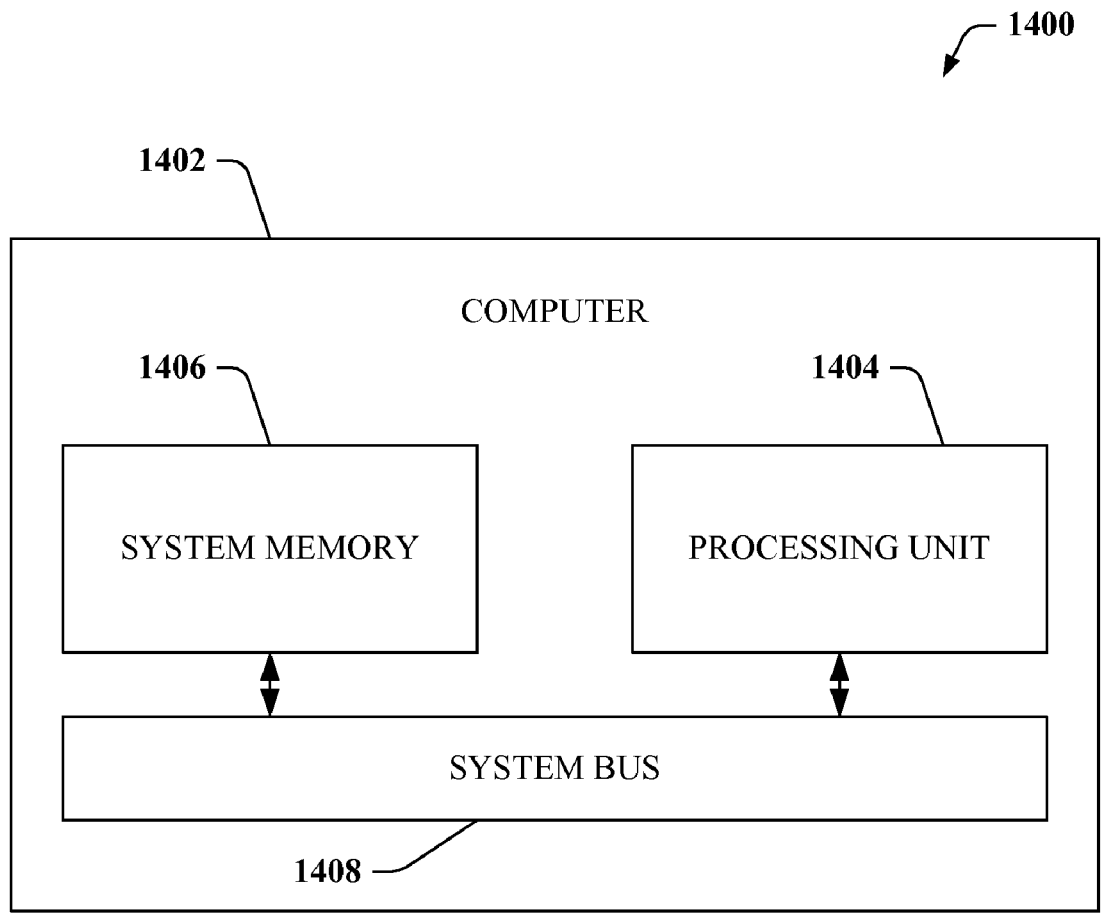
FIG. 14 illustrates a sample operating environment providing processing, memory and/or communication functions for various aspects described herein.

Referring now to FIG. 14, there is illustrated a block diagram of a computer 1402 operable to provide networking and communication capabilities between a wired or wireless communication network and a server and/or communication device. In order to provide additional context for various aspects of the claimed subject matter, FIG. 14 and the following discussion are intended to provide a brief, general description of a suitable computing environment 1400 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer (1402) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors, such a single core processor, a multi-core processor, or any other suitable arrangement of processors. The system bus 1408 can be any of several types of bus structure that can further interconnect to a memory bus (with or without a memory controller), a peripheral bus, and a local bus using any of a variety of commercially available bus architectures. The system memory 1406 can include read-only memory (ROM), random access memory (RAM), high-speed RAM (such as static RAM), EPROM, EEPROM, and/or the like. Additionally or alternatively, the computer 1402 can include a hard disk drive, upon which program instructions, data, and the like can be retained. Moreover, removable data storage can be associated with the computer 1402. Hard disk drives, removable media, etc. can be communicatively coupled to the processing unit 1404 by way of the system bus 1408.

The system memory 1406 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1402 through one or more wired/wireless input devices, such as a keyboard, pointing and clicking mechanism, pressure sensitive screen, microphone, joystick, stylus pen, etc. A monitor or other type of interface can also be connected to the system bus 1408.

The computer 1402 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1402 can connect to other devices/networks by way of antenna, port, network interface adaptor, wireless access point, modem, and/or the like.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
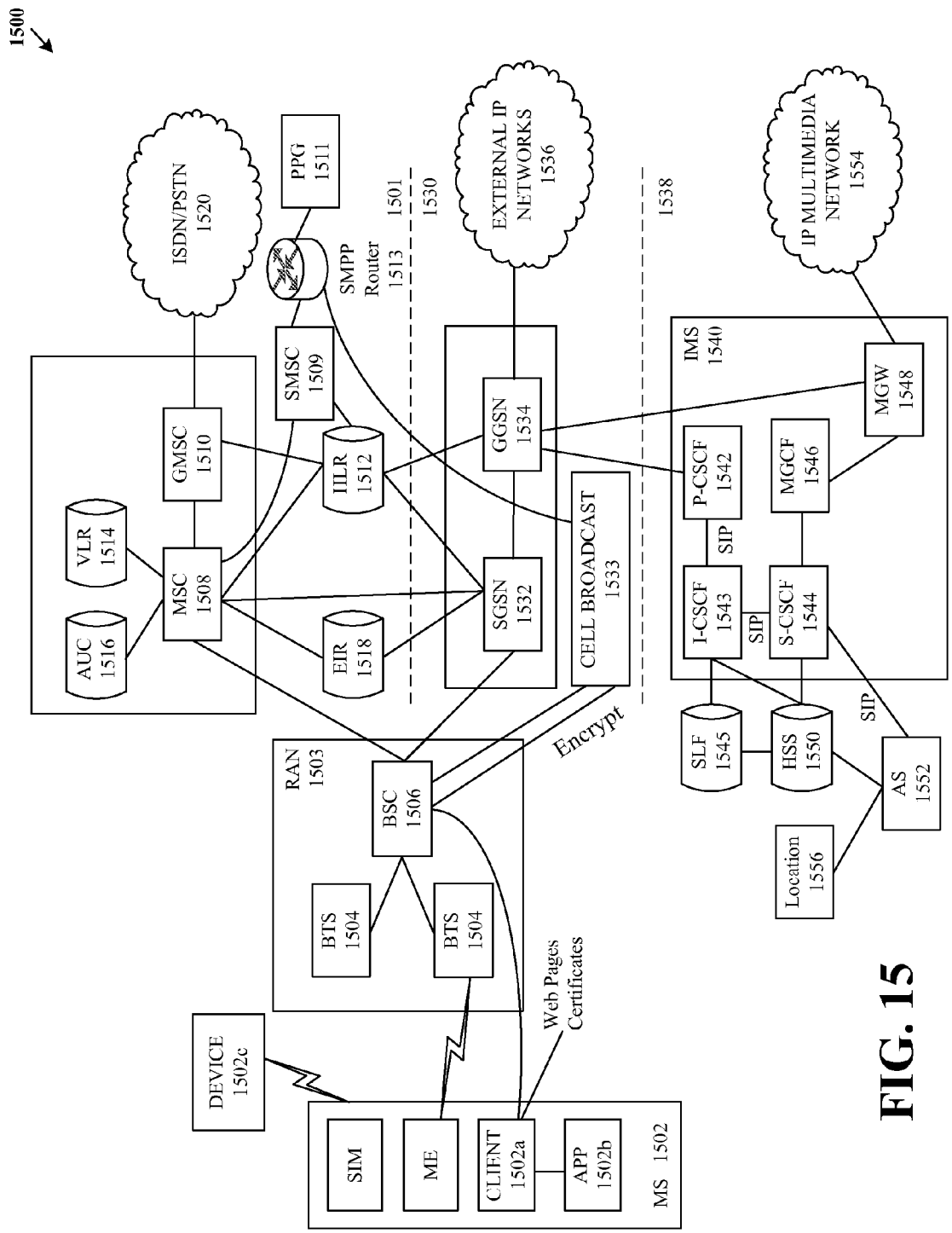
FIG. 15 illustrates a sample networking system that can provide remote communication between electronic communication devices according to further aspects.

Now turning to FIG. 15, such figure depicts a GSM/GPRS/IP multimedia network architecture 1500 that includes a GSM core network 1501, a GPRS network 1530 and an IP multimedia network 1538. The GSM core network 1501 includes a Mobile Station (MS) 1502, at least one Base Transceiver Station (BTS) 1504 and a Base Station Controller (BSC) 1506. The MS 1502 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1502 includes an embedded client 1502a that receives and processes messages received by the MS 1502. The embedded client 1502a can be implemented in JAVA and is discuss more fully below.

The embedded client 1502a communicates with an application 1502b that provides services and/or information to an end user. One example of the application can be navigation software that provides near real-time traffic information that is received via the embedded client 1502a to the end user. The navigation software can provide road conditions, suggest alternate routes, etc. based on the location of the MS 1502. Those of ordinary skill in the art understand that there are many different methods and systems of locating an MS 1502.

Alternatively, the MS 1502 and a device 1502c can be enabled to communicate via a short-range wireless communication link, such as BLUETOOTH. For example, a BLUETOOTH SIM Access Profile can be provided in an automobile (e.g., device 1502c) that communicates with the SIM in the MS 1502 to enable the automobile's communications system to pull information from the MS 1502. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1502c. There can be an endless number of devices 1502c that use the SIM within the MS 1502 to provide services, information, data, audio, video, etc. to end users.

The BTS 1504 is physical equipment, such as a radio tower, that enables a radio interface to communicate with the MS. Each BTS can serve more than one MS. The BSC 1506 manages radio resources, including the BTS. The BSC can be connected to several BTSs. The BSC and BTS components, in combination, are generally referred to as a base station (BSS) or radio access network (RAN) 1503.

The GSM core network 1501 also includes a Mobile Switching Center (MSC) 1508, a Gateway Mobile Switching Center (GMSC) 1510, a Home Location Register (HLR) 1512, Visitor Location Register (VLR) 1514, an Authentication Center (AuC) 1518, and an Equipment Identity Register (EIR) 1516. The MSC 1508 performs a switching function for the network. The MSC also performs other functions, such as registration, authentication, location updating, handovers, and call routing. The GMSC 1510 provides a gateway between the GSM network and other networks, such as an Integrated Services Digital Network (ISDN) or Public Switched Telephone Networks (PSTNs) 1520. In other words, the GMSC 1510 provides interworking functionality with external networks.

The HLR 1512 is a database or component(s) that comprises administrative information regarding each subscriber registered in a corresponding GSM network. The HLR 1512 also includes the current location of each MS. The VLR 1514 is a database or component(s) that includes selected administrative information from the HLR 1512. The VLR includes information necessary for call control and provision of subscribed services for each MS currently located in a geographical area controlled by the VLR. The HLR 1512 and the VLR 1514, together with the MSC 1508, provide the call routing and roaming capabilities of GSM. The AuC 1516 provides the parameters needed for authentication and encryption functions. Such parameters allow verification of a subscriber's identity. The EIR 1518 stores security-sensitive information about the mobile equipment.

A Short Message Service Center (SMSC) 1509 allows one-to-one Short Message Service (SMS) messages to be sent to/from the MS 1502. A Push Proxy Gateway (PPG) 1511 is used to "push" (e.g., send without a synchronous request) content to the MS 1502. The PPG 1511 acts as a proxy between wired and wireless networks to facilitate pushing of data to the MS 1502. A Short Message Peer to Peer (SMPP) protocol router 1513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1502 sends a location update including its current location information to the MSC/VLR, via the BTS 1504 and the BSC 1506. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1530 is logically implemented on the GSM core network architecture by introducing two packet-switching network nodes, a serving GPRS support node (SGSN) 1532, a cell broadcast and a Gateway GPRS support node (GGSN) 1534. The SGSN 1532 is at the same hierarchical level as the MSC 1508 in the GSM network. The SGSN controls the connection between the GPRS network and the MS 1502. The SGSN also keeps track of individual MS's locations and security functions and access controls.

A Cell Broadcast Center (CBC) 1533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1534 provides a gateway between the GPRS network and a public packet network (PDN) or other IP networks 1536. That is, the GGSN provides interworking functionality with external networks, and sets up a logical link to the MS through the SGSN. When packet-switched data leaves the GPRS network, it is transferred to an external TCP-IP network 1536, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1538 was introduced with 3GPP Release 5, and includes an IP multimedia subsystem (IMS) 1540 to provide rich multimedia services to end users. A representative set of the network entities within the IMS 1540 are a call/session control function (CSCF), a media gateway control function (MGCF) 1546, a media gateway (MGW) 1548, and a master subscriber database, called a home subscriber server (HSS) 1550. The HSS 1550 can be common to the GSM network 1501, the GPRS network 1530 as well as the IP multimedia network 1538.

The IP multimedia system 1540 is built around the call/session control function, of which there are three types: an interrogating CSCF (I-CSCF) 1543, a proxy CSCF (P-CSCF) 1542, and a serving CSCF (S-CSCF) 1544. The P-CSCF 1542 is the MS's first point of contact with the IMS 1540. The P-CSCF 1542 forwards session initiation protocol (SIP) messages received from the MS to an SIP server in a home network (and vice versa) of the MS. The P-CSCF 1542 can also modify an outgoing request according to a set of rules defined by the network operator (for example, address analysis and potential modification).

The I-CSCF 1543 forms an entrance to a home network and hides the inner topology of the home network from other networks and provides flexibility for selecting an S-CSCF. The I-CSCF 1543 can contact a subscriber location function (SLF) 1545 to determine which HSS 1550 to use for the particular subscriber, if multiple HSS's 1550 are present. The S-CSCF 1544 performs the session control services for the MS 1502. This includes routing originating sessions to external networks and routing terminating sessions to visited networks. The S-CSCF 1544 also decides whether an application server (AS) 1552 is required to receive information on an incoming SIP session request to ensure appropriate service handling. This decision is based on information received from the HSS 1550 (or other sources, such as an application server 1552). The AS 1552 also communicates to a location server 1556 (e.g., a Gateway Mobile Location Center (GMLC)) that provides a position (e.g., latitude/longitude coordinates) of the MS 1502.

The HSS 1550 includes a subscriber profile and keeps track of which core network node is currently handling the subscriber. It also supports subscriber authentication and authorization functions (AAA). In networks with more than one HSS 1550, a subscriber location function provides information on the HSS 1550 that includes the profile of a given subscriber.

The MGCF 1546 provides interworking functionality between SIP session control signaling from the IMS 1540 and ISUP/BICC call control signaling from the external GSTN networks (not shown). It also controls the media gateway (MGW) 1548 that provides user-plane inter-working functionality (e.g., converting between AMR- and PCM-coded voice). The MGW 1548 also communicates with other IP multimedia networks 1554.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that provides an interface between short message service and Internet Protocol multimedia subsystem networks and devices, comprising:
    a short message routing component that receives a short message service message and identifies whether a recipient device identified by the short message service message is a packet-capable device; and
    a next generation serving mobile switching center that employs a packet-switched protocol and requests access to a packet-switched location server in response to the recipient device being a packet-capable device, and that employs a circuit-switched protocol and requests access to a circuit-switched location server in response to the recipient device not being the packet-capable device, wherein the circuit-switched location server and the packet-switched location server employ different communication protocols.

2. The system of claim 1, wherein the next generation serving mobile switching center further comprises an Internet Protocol short message service gateway that converts the short message service message from the circuit-switched protocol to the packet-switched protocol and that converts the short message service message from the packet-switched protocol to the circuit-switched protocol.

3. The system of claim 2, wherein the Internet Protocol short message service gateway extracts a circuit-switched protocol message encapsulated within a packet-switched message protocol in response to the recipient device not being the packet-capable device.

4. The system of claim 1, wherein the next generation serving mobile switching center further comprises a routing function that:
    queries a pre-paid database to determine pre-paid billing information associated with the recipient device and an initiating device; and
    interfaces with a mediation component to finalize billing associated with the short message service message.

5. The system of claim 1, wherein the next generation serving mobile switching center further comprises a delivery function that accesses a home location register of a legacy short message service network in response to the recipient device not being the packet-capable device, and accesses a home subscriber server of an Internet Protocol multimedia subsystem network in response to the recipient device being the packet-capable device.

6. The system of claim 1, wherein the next generation serving mobile switching center interfaces a short message service core network with an Internet Protocol multimedia subsystem core network, and provides conversion from mobile application part signaling system 7 protocol to Session Initiation Protocol and vice versa.

7. The system of claim 6, wherein the next generation serving mobile switching center provides an interface between an external short message entity application, connected to the short message service core network, and a packet-capable mobile device.

8. The system of claim 6, wherein the next generation serving mobile switching center provides an interface between an external short message entity application, utilizing a packet-switched protocol and connected to the Internet Protocol multimedia subsystem core network, and a circuit-switched device utilizing mobile application part signaling system 7 protocol.

9. The system of claim 6, wherein the next generation serving mobile switching center provides an interface between:
    a second short message service core, interfaced with the short message service core, and at least a session initiation protocol mobile device; and
    a second Internet Protocol multimedia subsystem core, interfaced with the Internet Protocol multimedia subsystem core, and at least a circuit-switched mobile application part signaling system 7 protocol mobile device.

10. The system of claim 1, wherein the recipient device comprises a short message service device in response to the recipient device not being the packet-capable device, and comprises an Internet Protocol multimedia subsystem device in response to the recipient device being the packet-capable device.

11. The system of claim 1, wherein the packet-switched location server is a home subscriber server that communicates with a packet-switched protocol associated with an Internet Protocol multimedia subsystem core network.

12. The system of claim 1, the circuit-switched location server is a home location register that communicates via a circuit-switched protocol associated with a short message service core network.

13. A method of interfacing circuit-switched and packet-switched mobile messaging networks, comprising:
    receiving a mobile network message;

determining whether a target of the mobile network message is a packet-capable device supporting communication with a packet-switched domain;

employing a packet-based protocol for querying a location register to identify routing information related to the target in response to the target being the packet-capable device, the location register stores information pertinent to packet-capable devices and is nonresponsive to circuit-switched communication protocols; and forwarding the mobile network message via the identified routing information to the packet-switched domain for delivery to the target of the mobile network message.

14. The method of claim 13, wherein forwarding the mobile network message further comprises converting the mobile network message from a circuit-switched protocol to a packet-switched protocol prior to the forwarding.

15. The method of claim 14, wherein the converting further comprises converting the mobile network message from a short message service signaling system 7 protocol to a session initiation protocol.

16. The method of claim 13, further comprising employing a circuit-switched protocol for querying a second location register to identify routing information related to the target in response to the target not being the packet-capable device.

17. The method of claim 13, further comprising:
determining whether the target is on a pre-paid billing system; and
implementing pre-paid billing procedures at least for the target for the mobile network message in response to the target being on the pre-paid billing system, and otherwise implementing post-paid billing procedures for the mobile network message.

18. A system that interfaces circuit-switched and packet-switched mobile messaging networks, comprising:
means for receiving a mobile network message;
means for determining whether a target of the mobile network message is a packet-switched device supporting communication with a packet-switched domain;
means for querying a storage entity according to a packet-related communication protocol to identify routing information related to the target in response to the target being the packet-switched device, the storage entity includes information pertinent to packet-capable devices; and
means for employing the identified routing information for forwarding the mobile network message to the packet-switched domain for delivery to the target of the mobile network message.

19. The system of claim 18, further comprising means for converting the mobile network message from a circuit-switched protocol to a packet-switched protocol.

20. The system of claim 18, further comprising means for querying a second storage entity that communicates according to a circuit-switched communication protocol to identify location information related to the target in response to the target being in the circuit-switched domain.

* * * * *